United States Patent
Tanno et al.

(10) Patent No.: US 11,951,782 B2
(45) Date of Patent: Apr. 9, 2024

(54) PNEUMATIC TIRE AND ASSEMBLY SHEET

(71) Applicant: The Yokohama Rubber Co., LTD., Tokyo (JP)

(72) Inventors: Atsushi Tanno, Hiratsuka (JP); Shun Sato, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 530 days.

(21) Appl. No.: 17/254,836

(22) PCT Filed: Jun. 22, 2018

(86) PCT No.: PCT/JP2018/023846
§ 371 (c)(1),
(2) Date: Dec. 21, 2020

(87) PCT Pub. No.: WO2019/244349
PCT Pub. Date: Dec. 26, 2019

(65) Prior Publication Data
US 2021/0260938 A1    Aug. 26, 2021

(51) Int. Cl.
*B60C 23/04*    (2006.01)
*B60C 5/14*    (2006.01)
*B60C 9/11*    (2006.01)

(52) U.S. Cl.
CPC ............ *B60C 23/0493* (2013.01); *B60C 5/14* (2013.01); *B60C 9/11* (2013.01)

(58) Field of Classification Search
CPC ................ B29D 2030/0072; B29D 2030/0077
See application file for complete search history.

(56) References Cited

U.S. PATENT DOCUMENTS 5,587,698 A * 12/1996 Genna ............... B60C 23/00363
152/417
2003/0217797 A1    11/2003 Poulbot et al.
(Continued)

FOREIGN PATENT DOCUMENTS

JP    2004-001716    1/2004
JP    2005-081864    3/2005
(Continued)

OTHER PUBLICATIONS

FiberLine, "Carbon: Versatile, Corrosion Resistant & Conductive", Jul. 2019 through Internet Archive's Wayback Machine .<https://web.archive.org/web/20190705073853/https://www.fiber-line.com/en/fibers/carbon-fiber>. Accessed Jul. 19, 2023. (Year: 2019).*
(Continued)

*Primary Examiner* — Robert C Dye
*Assistant Examiner* — Alexander D Booth
(74) *Attorney, Agent, or Firm* — Thorpe North & Western

(57) ABSTRACT

A pneumatic tire includes: a tire inner surface rubber layer constituting a tire inner surface; and an electrically conductive member, at least a part of the electrically conductive member being disposed on an inner cavity side of the tire inner surface rubber layer. The electrically conductive member includes a knitted fabric including a yarn, at least a part of the yarn having electrical conductivity, the knitted fabric having stretchability. The electrically conductive member is electrically connected to an electrical device provided in the tire. The electrically conductive member is disposed extending along the tire inner surface in a tire radial direction, and a direction in which the electrically conductive member extends aligns with a direction in which the knitted fabric has stretchability. The knitted fabric is configured by mixing a yarn having electrical conductivity and a yarn having non-electrical conductivity.

23 Claims, 18 Drawing Sheets

(56) References Cited

U.S. PATENT DOCUMENTS

| | | |
|---|---|---|
| 2005/0132790 A1 | 6/2005 | Starinshak |
| 2007/0241987 A1* | 10/2007 | Kish .................... H01Q 1/2241 |
| | | 343/897 |
| 2010/0117537 A1 | 5/2010 | Horppu et al. |
| 2010/0276048 A1* | 11/2010 | Adamson ............ B60C 23/0493 |
| | | 152/450 |
| 2015/0273944 A1* | 10/2015 | Yukawa ................ B60C 19/002 |
| | | 152/510 |
| 2017/0174010 A1* | 6/2017 | Sportelli .................. B60C 15/04 |
| 2020/0331308 A1* | 10/2020 | Fujiwara ................. B60C 19/08 |
| 2021/0291598 A1* | 9/2021 | Pavoni .................. B60C 19/122 |
| 2022/0144022 A1* | 5/2022 | Wei ......................... B60C 19/08 |

FOREIGN PATENT DOCUMENTS

| | | |
|---|---|---|
| JP | 2005-178763 | 7/2005 |
| JP | 2005-193711 | 7/2005 |
| JP | 2010-526400 | 7/2010 |
| JP | 2016-203829 | 12/2016 |
| JP | 2017-121730 | 7/2017 |
| WO | WO 2008/129118 | 10/2008 |
| WO | WO 2018/011001 A1 | 1/2018 |

OTHER PUBLICATIONS

Phelps. "Fiberglass—Types, Properties, and Applications Across Industries". May 2017 through Internet Archive's Wayback Machine. <https://web.archive.org/web/20170506083458/http://www.phelpsgaskets.com/blog/fiberglass--types-properties-and-applications-across-industries>. Accessed Jul. 19, 2023. (Year: 2017).*

International Search Report for International Application No. PCT/JP2018/023846 dated Sep. 25, 2018, 4 pages, Japan.

* cited by examiner

PNEUMATIC TIRE AND ASSEMBLY SHEET

TECHNICAL FIELD

The present technology relates to a pneumatic tire and an assembly sheet.

BACKGROUND ART

On an inner surface of a pneumatic tire, wiring may be laid or an electrical component may be installed. A technique for providing a sensor on the inner surface of the pneumatic tire is known (for example, Japan Unexamined Patent Publication No. 2004-001716). In this technique, a conductor used as an antenna is provided in the tire, and non-contact communication is performed between the sensor and a device external to the tire.

Additionally, a technique is known in which a heater is provided on an inner surface of a pneumatic tire (for example, Japan Unexamined Patent Publication No. 2016-203829). In this technique, power is fed to the heater via an electrically conductive yarn adhered to the tire inner surface.

In regard to laying of wiring or installation of an electrical component on the inner surface of the pneumatic tire, the technique described in Japan Unexamined Patent Publication No. 2004-001716 has room for improvement regarding a method for installing a conductor used as an antenna. Additionally, the technique described in Japan Unexamined Patent Publication No. 2016-203829 has room for improvement regarding installation of wiring through which power is fed.

SUMMARY

The present technology provides a pneumatic tire and an assembly sheet that allow wiring and an electrical component to be appropriately installed on the inner surface of the tire.

A pneumatic tire according to an aspect of the present technology includes: a tire inner surface rubber layer included in a tire inner surface, and an electrically conductive member, at least a part of the electrically conductive member being disposed on an inner cavity side of the tire inner surface rubber layer, and the electrically conductive member includes a knitted fabric including a yarn, at least a part of the yarn having electrical conductivity, the knitted fabric having stretchability.

Preferably, the electrically conductive member is electrically connected to an electrical device provided in the tire.

Preferably, the electrically conductive member is disposed extending along the tire inner surface, and a direction in which the electrically conductive member extends aligns with a direction in which the knitted fabric has stretchability.

Preferably, the knitted fabric is configured by mixing a yarn having electrical conductivity and a yarn having non-electrical conductivity.

Preferably, the yarn having electrical conductivity has a color different from a color of the yarn having non-electrical conductivity.

Preferably, the tire inner surface rubber layer is an innerliner layer, and at least a part of the yarn constituting the knitted fabric is partially embedded in the innerliner layer or a rubber layer disposed on the inner cavity side of the innerliner layer.

Preferably, the electrically conductive member includes a gap portion formed between the yarns constituting the knitted fabric, and the tire inner surface rubber layer includes an exposed region exposed on a surface of the knitted fabric through the gap portion.

Preferably, the knitted fabric has an air permeation amount of 60 $cm^3/cm^2 \cdot s$ or greater.

Preferably, the pneumatic tire includes a plurality of the electrically conductive members, each of the plurality of electrically conductive members is electrically connected to an electrical device provided in the tire, and power is fed to the electrical device via the electrically conductive member.

Preferably, the electrically conductive member is provided in a range of 40% or greater and 70% or less of a tire cross-sectional height.

The pneumatic tire may further include a cover rubber layer provided on a tire inner cavity side of the electrically conductive member and covering a part of the electrically conductive member.

Preferably, the electrically conductive member extends on the tire inner surface beyond a bead toe of a bead portion at least to a bead base portion.

Preferably, the electrically conductive member electrically connects at least a part of a region between the electrical device provided in the tire and an electrode provided on a rim on which the tire is mounted.

Preferably, in the part of the region between the electrical device and the electrode, the electrically conductive member passes through a tire inner cavity portion located away from the tire inner surface.

Preferably, the electrically conductive member is provided corresponding to each of a pair of the bead base portions, the electrically conductive member is electrically connected to each of the electrodes contacting the pair of bead base portions and to the electrical device provided in the tire, and power is fed to the electrical device via the electrically conductive member.

Preferably, a tensile force in a length direction of the electrically conductive member has a value per width of 0.01 N/mm or greater and 1.0 N/mm or less.

Preferably, for the electrically conductive member, a ratio Imax/S of a maximum value Imax (A) of current transmitted to a total cross-sectional area S ($mm^2$) of the yarn having electrical conductivity is $0.01 \leq Imax/S \leq 20$, and a ratio Pmax/WH of a maximum value Pmax (W) of the power transmitted to a width WH (mm) orthogonal to an extension direction of the yarn having electrical conductivity is $0.01 \leq Pmax/WH \leq 2$.

Preferably, on the tire inner surface, the electrical device provided in the tire is disposed in a region other than a portion immediately below a circumferential groove or in a region from an end portion of the tire inner surface to a position corresponding to 50% of a tire cross-sectional height.

An assembly sheet according to an aspect of the present technology includes: an electrically conductive layer including a knitted fabric configured by mixing a yarn having electrical conductivity and a yarn having non-electrical conductivity, the knitted fabric having stretchability, and; a rubber layer provided on at least one of a main surface and another main surface of the electrically conductive layer, and the assembly sheet is configured by layering the electrically conductive layer and the rubber layer.

Preferably, a 100% modulus in a state in which the electrically conductive layer is layered on the rubber layer is 102% or greater and 180% or less of a 100% modulus of the rubber layer alone.

According to the pneumatic tire and the assembly sheet according to an embodiment of the present technology, wiring and an electrical component can be appropriately installed on the inner surface of the tire.

DETAILED DESCRIPTION

Embodiments of the present technology are described in detail below with reference to the drawings. In the embodiments described below, identical or substantially similar components to those of other embodiments have identical reference signs, and descriptions of those components are either simplified or omitted. The present technology is not limited by the embodiment. Constituents of the embodiments include elements that are essentially identical or that can be substituted or easily conceived by one skilled in the art. Note that it is possible to combine the configurations described below as desired. Moreover, various omissions, substitutions, and changes to the configurations can be carried out within the scope of the present technology.

Pneumatic Tire

Figure 1:
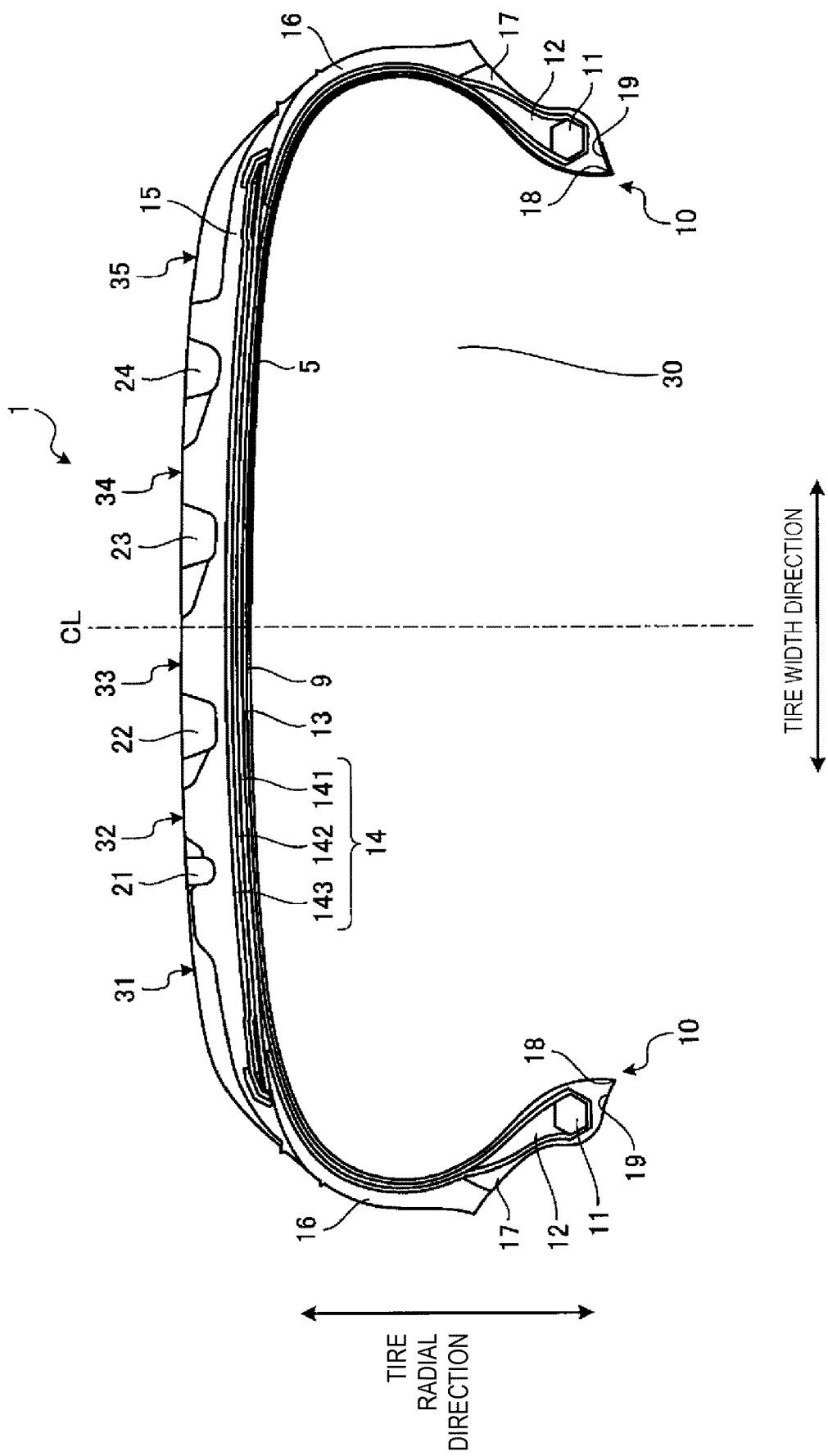
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. FIG. 1 is a cross-sectional view of a half region in a tire radial direction. Additionally, FIG. 1 illustrates a radial tire for a passenger vehicle as an example of a pneumatic tire.

In FIG. 1, "cross section in a tire meridian direction" refers to a cross section of the tire taken along a plane that includes a tire rotation axis (not illustrated). Reference sign CL denotes a tire equatorial plane and refers to a plane normal to the tire rotation axis that passes through the center point of the tire in a tire rotation axis direction. "Tire width direction" refers to the direction parallel with the tire rotation axis. "Tire radial direction" refers to the direction perpendicular to the tire rotation axis.

Furthermore, an inner side in a vehicle width direction and an outer side in the vehicle width direction are defined with respect to the vehicle width direction in a case where the tire is mounted on the vehicle. Additionally, left and right regions demarcated by the tire equatorial plane CL are defined as: a vehicle width direction outer side region and a vehicle width direction inner side region. In addition, in a case where a tire mounting direction with respect to the vehicle is designated, a pneumatic tire 1 includes a mounting direction indicator portion (not illustrated) that indicates the tire mounting direction with respect to the vehicle. The mounting direction indicator portion, for example, is composed of a mark or ridges/grooves on a sidewall portion of the tire. For example, Economic Commission for Europe Regulation 30 (ECE R30) requires that the mounting direction indicator portion be provided on the sidewall portion on the outer side in the vehicle width direction in a case where the tire is mounted on a vehicle.

The pneumatic tire (that may be simply referred to as the tire) 1 has an annular structure with the tire rotation axis as its center and includes: a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17.

The pair of bead cores 11, 11 include one or a plurality of bead wires made of steel and wound annularly multiple times and are embedded in a bead portion 10 to configure the core of the left and right bead portions 10. The pair of bead fillers 12, 12 are disposed on an outer side in the tire radial direction of the pair of bead cores 11, 11 to reinforce the bead portions 10.

The carcass layer 13 has a single layer structure made of one carcass ply or a multilayer structure made of a plurality of carcass plies being layered and extends between the left and right bead cores 11, 11 in a toroidal shape, forming the framework of the tire. Additionally, both end portions of the carcass layer 13 are turned back on an outer side in the tire width direction so as to wrap around the bead cores 11 and the bead fillers 12 and fixed. Additionally, the carcass ply of the carcass layer 13 is made by performing rolling processing on a plurality of carcass cords made of steel or an organic fiber material (e.g. aramid, nylon, polyester, rayon, or the like) and covered with coating rubber. The carcass ply has a carcass angle (defined as the inclination angle of a longitudinal direction of the carcass cords with respect to a tire circumferential direction), as an absolute value of 80 degrees or greater and 90 degrees or smaller.

The belt layer 14 is a multilayer structure including a pair of cross belts 141, 142 and a belt cover 143 and is disposed around the outer circumference of the carcass layer 13. The pair of cross belts 141, 142 are made by performing rolling processing on a plurality of belt cords made of steel or an organic fiber material and covered with coating rubber. The cross belts 141, 142 have a belt angle, as an absolute value, ranging from 20 degrees to 55 degrees. Additionally, the pair of cross belts 141, 142 have belt angles (defined as the inclination angles of the belt cords in the longitudinal direction with respect to the tire circumferential direction) of opposite signs, and the belts are layered with the belt cords intersecting each other (what is called a crossply structure) in the longitudinal direction. Additionally, the belt cover 143 is formed by covering, with coating rubber, belt cover cords made of steel or an organic fiber material. The belt cover 143 has a belt angle with an absolute value of 0 degrees or greater and 10 degrees or smaller. Additionally, the belt cover 143 is, for example, a strip material formed by coating one or a plurality of belt cover cords with coating rubber, and the strip material is spirally wound around outer circumferential surfaces of the cross belts 141, 142 multiple times in the tire circumferential direction.

The pneumatic tire 1 includes an innerliner layer 9 on a side of a tire inner cavity 30 of the carcass layer 13. The innerliner layer 9 is the tire inner surface, i.e. an inner circumferential surface of the carcass layer 13 and reaches each of the positions of the bead cores 11 of the pair of bead portions 10 at both end portions in the tire width direction, where the innerliner layer 9 is rolled in the tire circumferential direction in a toroidal shape and bonded. The innerliner layer 9 suppresses permeation of air molecules to a tire outer side. The innerliner layer 9 is a tire inner surface rubber layer. An inner surface of the innerliner layer 9 is a tire inner surface. The innerliner layer 9 constitutes the tire inner surface.

The tread rubber 15 is disposed on the outer side in the tire radial direction of the carcass layer 13 and the belt layer 14 and constitutes a tread portion of a tire. The pair of sidewall rubbers 16, 16 are disposed on the outer side in the tire width direction of the carcass layer 13 and constitute left and right sidewall portions. The pair of rim cushion rubbers 17, 17 are disposed along the left and right bead cores 11, 11 and the turned back portions of the carcass layer 13 to constitute rim fitting surfaces of the bead portions 10.

The bead portion 10 includes a bead base portion 19. The bead base portion 19 is a surface on an inner side in the tire radial direction of the bead portion 10 and is formed inclined with respect to the tire rotation axis in a direction diverging to an outer side in the tire radial direction, from an inner side toward the outer side in the tire width direction. An end portion on the inner side in the tire width direction of the bead base portion 19 is provided as a bead toe 18, and the bead toe 18 forms a bead portion innermost end corresponding to the innermost end portion of the bead portion 10 in the tire radial direction.

Additionally, the pneumatic tire 1 includes, in a tread surface, a plurality of circumferential grooves 21 to 24 extending in the tire circumferential direction; and a plurality of land portions 31 to 35 defined by the plurality of circumferential main grooves 21 to 24.

Electrically Conductive Member

As illustrated in FIG. 1, the pneumatic tire 1 includes an electrically conductive member 5 disposed on the tire inner surface. In FIG. 1, the electrically conductive member 5 is disposed extending in the tire radial direction along the tire inner surface. The electrically conductive member 5 includes a yarn at least partially having electrical conductivity and includes a knitted fabric having stretchability. The electrically conductive member 5 may be provided on the tire inner surface during molding of the tire 1 or may be provided on the tire inner surface after molding of the tire 1.

Figure 2:
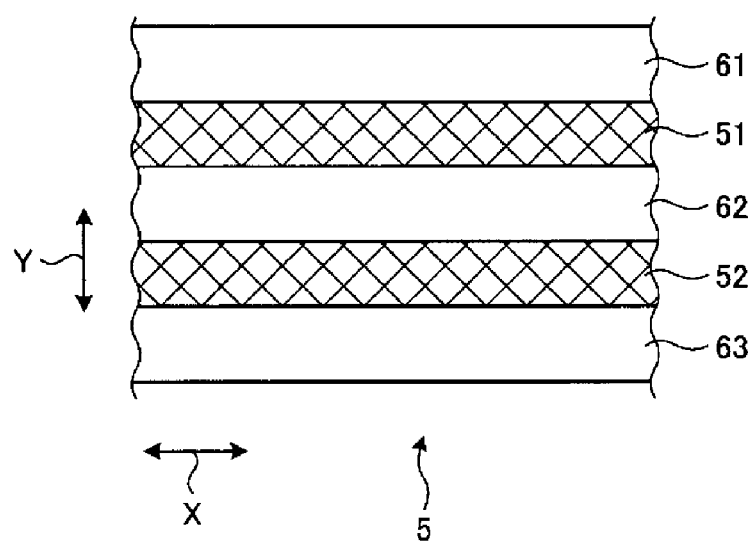
FIG. 2 is a plan view illustrating a configuration example of an electrically conductive member illustrated in FIG. 1.

FIG. 2 is a plan view illustrating a configuration example of the electrically conductive member 5 illustrated in FIG. 1. In FIG. 2, a length direction or extension direction of the electrically conductive member 5 is defined as an X direction, and the width direction of the electrically conductive member 5 is defined as a Y direction. The Y direction is a direction orthogonal to the X direction.

In FIG. 2, the electrically conductive member 5 includes electrically conductive portions 51 and 52 and non-electrically conductive portions 61, 62, and 63. In FIG. 2, the non-electrically conductive portion 61, the electrically conductive portion 51, the non-electrically conductive portion 62, the electrically conductive portion 52, and the non-electrically conductive portion 63 are disposed side by side in the Y direction. The non-electrically conductive portion 61, the electrically conductive portion 51, the non-electrically conductive portion 62, the electrically conductive portion 52, and the non-electrically conductive portion 63 all extend in the X direction. In FIG. 2, the electrically conductive portions 51 and 52 are regions including an electrically conductive yarn. The non-electrically conductive portions 61, 62, and 63 are regions including only a non-electrically conductive yarn.

As illustrated in FIG. 2, the electrically conductive portion 51 is disposed between the non-electrically conductive portion 61 and the non-electrically conductive portion 62. The electrically conductive portion 52 is disposed between the non-electrically conductive portion 62 and the non-electrically conductive portion 63. Thus, the electrically conductive member 5 illustrated in FIG. 2 is electrically insulated from the two electrically conductive portions 51 and 52 by the non-electrically conductive portion 62. Because the electrically conductive portion 51 is sandwiched between the non-electrically conductive portion 61 and the non-electrically conductive portion 62 in the Y direction, the electrically conductive portion 51 is electrically insulated from the other portions constituting the tire 1 in a case where the electrically conductive portion 51 is disposed on the tire inner surface. In addition, because the electrically conductive portion 52 is sandwiched between the non-electrically conductive portion 62 and the non-electrically conductive portion 63 in the Y direction, the electrically conductive portion 52 is electrically insulated from other portions constituting the tire 1 in a case where the electrically conductive portion 52 is disposed on the tire inner surface. The electrically conductive member 5 allows feeding of a power supply voltage to be achieved. In other words, the feeding of the power supply voltage can be achieved by associating the two electrically conductive portions 51 and 52 with a positive electrode and a negative electrode.

Additionally, the non-electrically conductive portions 61, 62, and 63 have more stretchability along the X direction than the electrically conductive portions 51 and 52. Thus, in a case where the electrically conductive member 5 is provided on the inner surface of the tire 1, routing is facilitated. The use of the electrically conductive member 5 facilitates the work of providing the electrically conductive member 5 along the inner surface of the tire 1.

Knitted Fabric of Electrically Conductive Member

Figure 3:
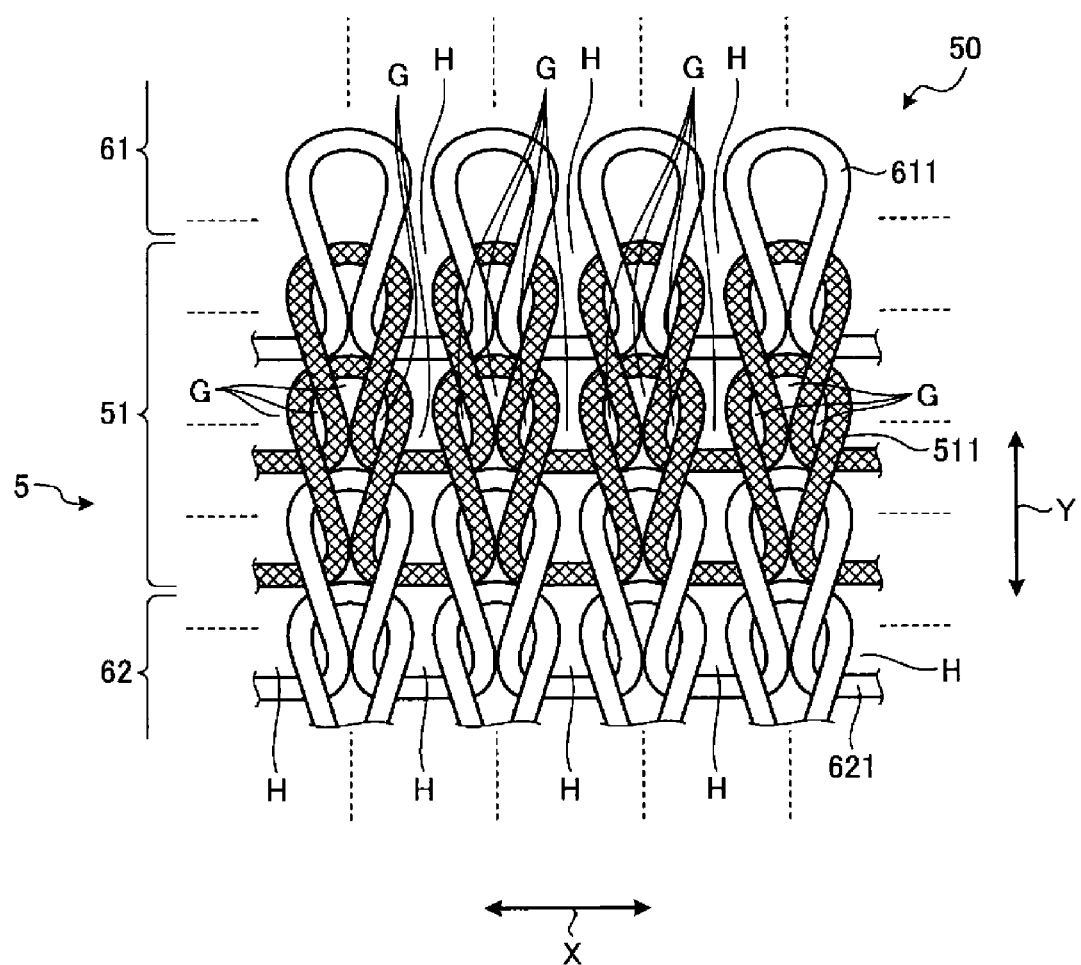
FIG. 3 is an enlarged view of electrically conductive portions and non-electrically conductive portions in FIG. 2.

FIG. 3 is an enlarged view of the electrically conductive portion 51 and the non-electrically conductive portions 61 and 62 in FIG. 2. As illustrated in FIG. 3, the electrically conductive member 5 includes: a knitted fabric 50 configured by mixing a yarn having electrical conductivity (hereinafter, also referred to as an electrically conductive yarn) 511 and yarns having non-electrical conductivity (hereinafter may be referred to as non-electrically conductive yarns) 611 and 621. The knitted fabric 50 is a single knitted fabric made by knitting a mixture of the electrically conductive yarn 511 and the non-electrically conductive yarns 611 and 621 in an identical manner of knitting. Knitting of the knitted fabric 50 illustrated in FIG. 3 is an example, and any other knitting method may be used as long as the knitted fabric has stretchability along the X direction. The X direction is the direction in which the electrically conductive member 5 extends and in which the knitted fabric 50 has stretchability. Thus, the direction in which the electrically conductive member 5 extends aligns with the direction in which the knitted fabric 50 has stretchability.

In a plan view, the knitted fabric 50 has: the electrically conductive portion 51 corresponding to a region including the electrically conductive yarn 511; and a non-electrically conductive portion 61 including only the non-electrically conductive yarn 611. In addition, in a plan view, the knitted fabric 50 includes: the electrically conductive portion 51 corresponding to a region including the electrically conductive yarn 511; and a non-electrically conductive portion 62 corresponding to a region including only a non-electrically conductive yarn 621. The electrically conductive portion 51, corresponding to a region including the electrically conductive yarn 511, extends continuously in the X direction to function as an electrically conductive member.

In the region of the knitted fabric 50 including the electrically conductive yarn 511, the electrically conductive yarn 511 is preferably exposed on both front and back sides of the knitted fabric 50. For example, in FIG. 3, a front side of the page corresponds to a front side, and a back side of the page corresponds to the back side. In other words, the electrically conductive member 5 has a uniform structure in a thickness direction.

The elastic modulus differs between the electrically conductive yarn 511 and the non-electrically conductive yarns 611 and 621. The knitted fabric 50 may include a portion in the thickness direction that is embedded in the rubber layer of the tire inner surface. In a case where, in the portion embedded in the rubber layer of the tire inner surface, the elastic modulus varies in the thickness direction, durability of the knitted fabric 50 is reduced, and the electrically conductive yarn 511 may be broken.

Here, the electrically conductive yarn 511 is preferably metal wire covered with an insulating coating. The insulating coating can prevent a short circuit at an unintended position in electrical wiring included in the electrically conductive member 5. Additionally, in a case where the insulating coating is melted by applying heat, the electrically conductive member 5 and an electrical device can be electrically connected by soldering. The insulating coating is preferably a resin such as nylon, polyester, polyurethane, or a fluorine resin. Copper wiring with an enamel coating having a heat resistance of at least 180° C. is most preferable.

The electrically conductive yarn 511 itself is a yarn that does not conform to elongation, but being configured as the knitted fabric 50 enables conformation to local elongation due to deformation of the tire 1. Thus, a change in electrical resistance is small. The electrical resistance of the electrically conductive member 5 is, for example, in a range of 4 Ω/m or greater and 15 Ω/m or less. The change in electrical resistance due to the stretch of the electrically conductive member 5 is 10% or less at 35% elongation. Additionally, the electrically conductive member 5 preferably has: an elongation at break of 200% or greater; and an electrical resistance increase rate of 30% or less after 500 thousand repetitions of 10% elongation. Note that the above-described electrical resistance is a value measured in a single continuous region made of an electrically conductive yarn. For example, the above-described values are obtained by measurement at two sections of the electrically conductive portion 51 in FIG. 2 and not by simultaneous conduction of electricity through the electrically conductive portion 51 and the electrically conductive portion 52.

A value T per width of the tensile force in the length direction of the electrically conductive member 5 is preferably in the relationship of Formula (1) at 100% elongation.

$$0.01 \text{ N/mm} \leq T \leq 1.0 \text{ N/mm} \tag{1}$$

In Formula (1), one continuous electrically conductive member (which may include the electrically conductive yarn and the non-electrically conductive yarn) to be installed in the tire is pulled at a speed of 500 mm/min using a tensile tester, and a tensile test force applied at the time of 100% elongation is designated as T. The width as used herein is a dimension obtained before the tensile test in a direction orthogonal to the extension direction of the entire electrically conductive member. In a case where the above-described T is greater than the range of Formula (1), uniformity of the tire 1 is degraded, and this is not preferable. In a case where the above-described T is smaller than the range of Formula (1), the yarn may be broken due to iterative strain, and this is not preferable.

The electrically conductive member 5 may include non-electrically conductive yarns disposed intermittently in the Y direction intersecting the X direction, the X direction corresponding to the extension direction. The non-electrically conductive yarns disposed in the Y-direction function as a cushion between the electrically conductive yarns 511. This enables prevention of the insulating coatings of the electrically conductive yarns 511 from being damaged in a case where the electrically conductive member 5 is elongated, allowing prevention of short-circuiting between the electrically conductive yarns 511.

Additionally, the electrically conductive yarn 511 preferably includes a plurality of metal wires bundled together. In a case where the plurality of metal wires are bundled, fatigue durability of the electrically conductive yarn 511 against iterative deformation of the tire 1 is improved.

The diameter of the metal wire, including the insulating coating, is preferably 10 μm or longer and 100 μm or shorter, and more preferably 20 μm or longer and 80 μm or shorter. Preferably, three or greater and 12 or fewer metal wires are bundled into one electrically conductive yarn 511. The knitted fabric 50 is made using a plurality of the electrically conductive yarns 511. For example, the electrically conductive yarn 511 may include a number of metal wires bundled together and each having a diameter of 30 µm, the diameter including the insulating coating.

The knitted fabric 50 is formed by mixing the electrically conductive yarn 511 and the non-electrically conductive yarns 611 and 621. The non-electrically conductive yarns 611 and 621 formed from organic fibers or the like are more easily impregnated into the rubber of the tire inner surface than the electrically conductive yarn 511, which is made of metal. Thus, the non-electrically conductive yarns 611 and 621 and the rubber of the tire inner surface exhibit excellent adhesiveness and improve durability. Note that, for improved impregnation into the rubber, the electrically conductive member 5 may be, during molding of the tire, elongated by 5% or less before being installed in the rubber material.

As described with reference to FIG. 2, the non-electrically conductive portion 62 including the non-electrically conductive yarn 621 is preferably provided between the electrically conductive portion 51 and the electrically conductive portion 52 both including the electrically conductive yarn 511. By providing the non-electrically conductive portion 62, a plurality of the electrically conductive portions 51 and 52 can be laid in the single knitted fabric 50.

The non-electrically conductive yarns 611 and 621 are preferably fibers having high heat resistance to accommodate soldering. For the non-electrically conductive yarns 611 and 621, for example, aramid or the like is preferably used in view of heat resistance and durability.

The non-electrically conductive yarns 611 and 621 may also each be formed by bundling a plurality of fibers. In that case, the yarn may be formed of bundling fibers thinner and more than the electrically conductive yarn 511. Thus, in place of the electrically conductive yarn 511, the flexibility of the knitted fabric 50 can be ensured.

The color of the electrically conductive yarn 511 is preferably different from the color of the non-electrically conductive yarns 611 and 621. The different colors allow connection positions for the electrodes and the like to be easily identified and thus workability is improved, in a case where the electrically conductive portions 51 and 52 are electrically connected to the electrical device by the electrically conductive yarn 511. In addition, the tire inner surface is often black in color, and thus the electrically conductive yarn 511 and the non-electrically conductive yarns 611 and 621 preferably each have a color that is higher in luminosity than black and that can ensure contrast.

The yarns constituting the knitted fabric 50, in other words, at least a part of the electrically conductive yarn 511 and the non-electrically conductive yarns 611 and the 621 is preferably embedded in the innerliner layer 9, corresponding to the tire inner surface rubber layer. Of the yarns constituting the knitted fabric 50, at least a part of the yarns in contact with the rubber layer of the tire inner surface is embedded in the rubber layer, and thus, strong bonding can be ensured, improving durability. Note that in a case where the minimum distance between the yarns constituting the knitted fabric 50 and the carcass cords of the carcass layer 13 is set equal to or longer than 0.3 mm, then preferably, air barrier properties of the innerliner layer 9 are not inhibited and oxidation degradation is not promoted.

Gap portions G and H formed between the yarns constituting the knitted fabric 50 are provided. With the electrically conductive member 5 disposed on the tire inner surface, the inner liner layer 9, corresponding to the tire inner surface rubber layer, is preferably exposed on the surface of the knitted fabric 50 through the gap portions G and H. That is, the innerliner layer 9 preferably includes exposed regions exposed on the surface of the knitted fabric 50 through the gap portions G and H. The electrically conductive yarn 511 may be fatigued and cut over a long term due to mutual contact and metal fatigue attributed to the structure of the knitted fabric 50. With the electrically conductive member 5 installed, the innerliner layer 9, corresponding to the tire inner surface rubber layer, is exposed on the surface of the knitted fabric 50, and at least a part of the electrically conductive member 5 is embedded in the tire inner surface rubber layer, thus allowing suppression from being fatigued and cut. In a freely selected region of the knitted fabric 50 in a plan view, the proportion of the total value of the exposed area of the rubber of the tire inner surface rubber layer is preferably, for example, 2% or greater and 70% or less. In a case where the proportion of the total value of the exposed area of the rubber in the freely selected region is less than 2%, durability is reduced, and this is not preferable. In addition, in a case where the proportion of the total value of the exposed area of the rubber in the freely selected region exceeds 70%, electrical connection with the electrical device or the like by soldering or the like is inhibited, and this is not preferable. Note that in the freely selected region of the knitted fabric 50 in a plan view, the proportion of the total value of the exposed area of the rubber of the tire inner surface rubber layer is more preferably 4% or greater and 50% or less.

Note that the air permeation amount of the knitted fabric 50 according to the JIS (Japanese Industrial Standard) L 1096 A method is preferably equal to or greater than 60 $cm^3/cm^2 \cdot s$. In addition, the air permeation amount of the knitted fabric 50 according to the JIS L 1096 A method is preferably in a range of 60 $cm^3/cm^2 \cdot s$ or greater and 500 $cm^3/cm^2 \cdot s$ or less. In a case where the knitted fabric 50 has an air permeation amount within the range described above, impregnation into the rubber is performed appropriately, and the adhesiveness is improved.

Setting Range of Electrically Conductive Member

Figure 4:
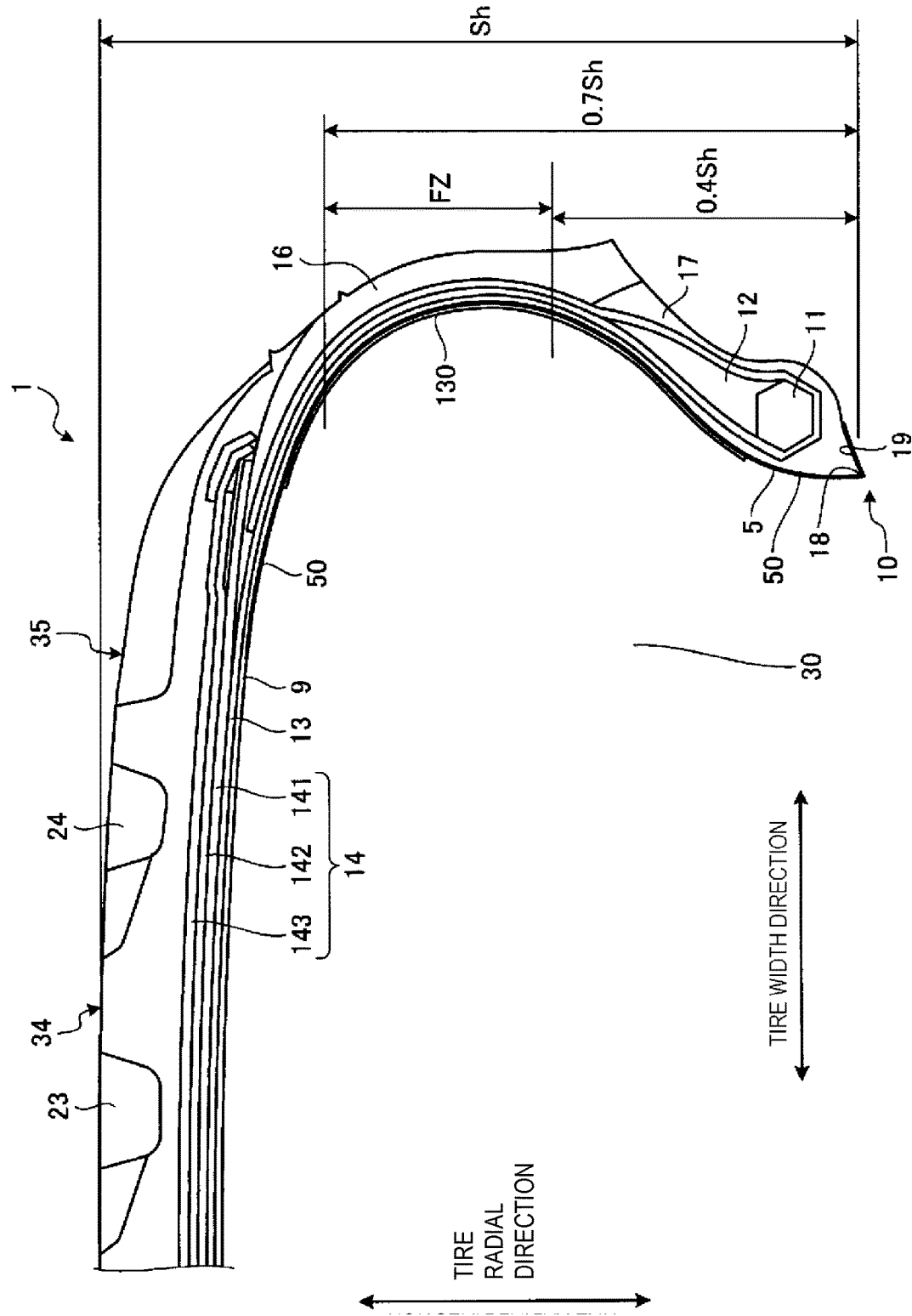
FIG. 4 is a diagram illustrating an example of a setting range of an electrically conductive member.

FIG. 4 is a diagram illustrating an example of a setting range of the electrically conductive member 5. The electrically conductive yarn 511 forming the knitted fabric 50 of the electrically conductive member 5 is likely to be cut due to mutual contact or metal fatigue, in particular, in a flex zone FZ of the tire 1. The flex zone FZ is a region in the sidewall rubber 16 that absorbs various forces applied from the road surface during traveling of the vehicle.

In FIG. 4, the flex zone FZ is, for example, in a range of 40% (0.4 Sh) or greater and 70% (0.7 Sh) or less of a tire cross-sectional height Sh. However, the tire cross-sectional height Sh is measured from a side of the bead portion 10, that is, from the inner side in the tire radial direction. The electrically conductive member 5 is preferably provided on the side of the tire inner cavity 30 of the innerliner layer 9 in the range including 40% or greater and 70% or less of the tire cross-sectional height Sh. "Cross-sectional height" is one-half of a difference between an tire outer diameter and a rim diameter, where the tire 1 is mounted on a specified rim and inflated to a specified internal pressure and is in an unloaded state. "Specified rim" refers to a "standard rim" defined by the JATMA (The Japan Automobile Tyre Manufacturers Association, Inc.), a "Design Rim" defined by the TRA (The Tire and Rim Association, Inc.), or a "Measuring Rim" defined by the ETRTO (The European Tyre and Rim Technical Organisation). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Note that, in JATMA, for passenger vehicle tires, the specified internal pressure is an air pressure of 180 kPa.

Cover Rubber Layer

Figure 5:
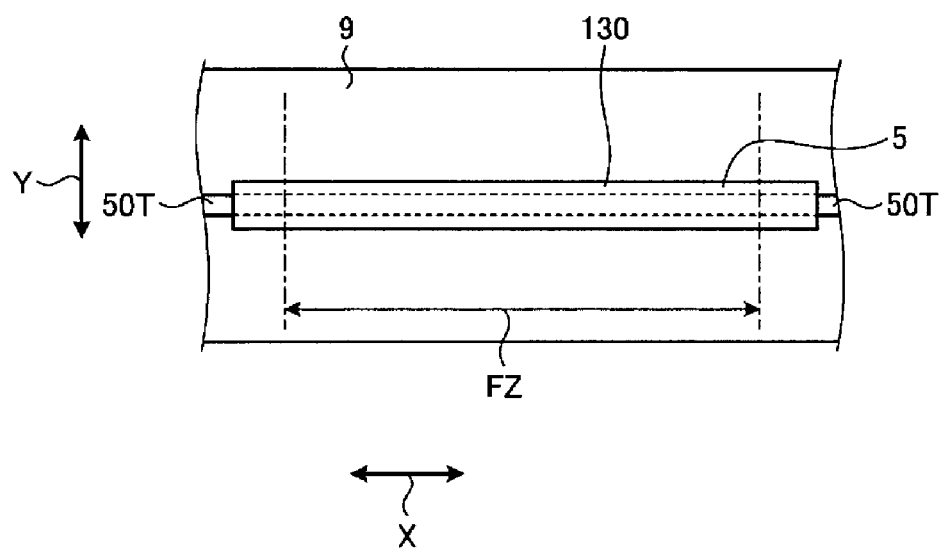
FIG. 5 is a diagram of a region including a flex zone as viewed from a tire inner cavity side.

The tire 1 illustrated in FIG. 4 is provided with a cover rubber layer 130. In a region including the flex zone FZ, the cover rubber layer 130 is disposed on the side of the tire inner cavity 30 of the electrically conductive member 5. The cover rubber layer 130 covers a part of the electrically conductive member 5. FIG. 5 is a view of a region including the flex zone FZ of the tire 1 as viewed from the side of the tire inner cavity 30.

As illustrated in FIG. 5, the electrically conductive member 5 is disposed on an inner cavity side of the innerliner layer 9, constituting the tire inner surface. In the flex zone FZ, the electrically conductive member 5 is sandwiched between the innerliner layer 9 and the cover rubber layer 130 and is completely embedded in the rubber. Thus, useless movement and mutual contact of the electrically conductive yarn 511 in the flex zone FZ is eliminated, thereby improving durability. Note that in FIGS. 4 and 5, both end portions SOT, SOT of the electrically conductive member 5 are not covered by the cover rubber layer 130 and are exposed to a tire inner cavity side.

Contact with Rim

Returning to FIG. 4, on the tire inner surface, the electrically conductive member 5 preferably extends beyond the bead toe 18 of the bead portion 10 of the tire 1, at least to the bead base portion 19. The extension of the electrically conductive member 5 to bead base portion 19 allows an electrical contact to be provided at a contact portion with the rim.

Figure 6:
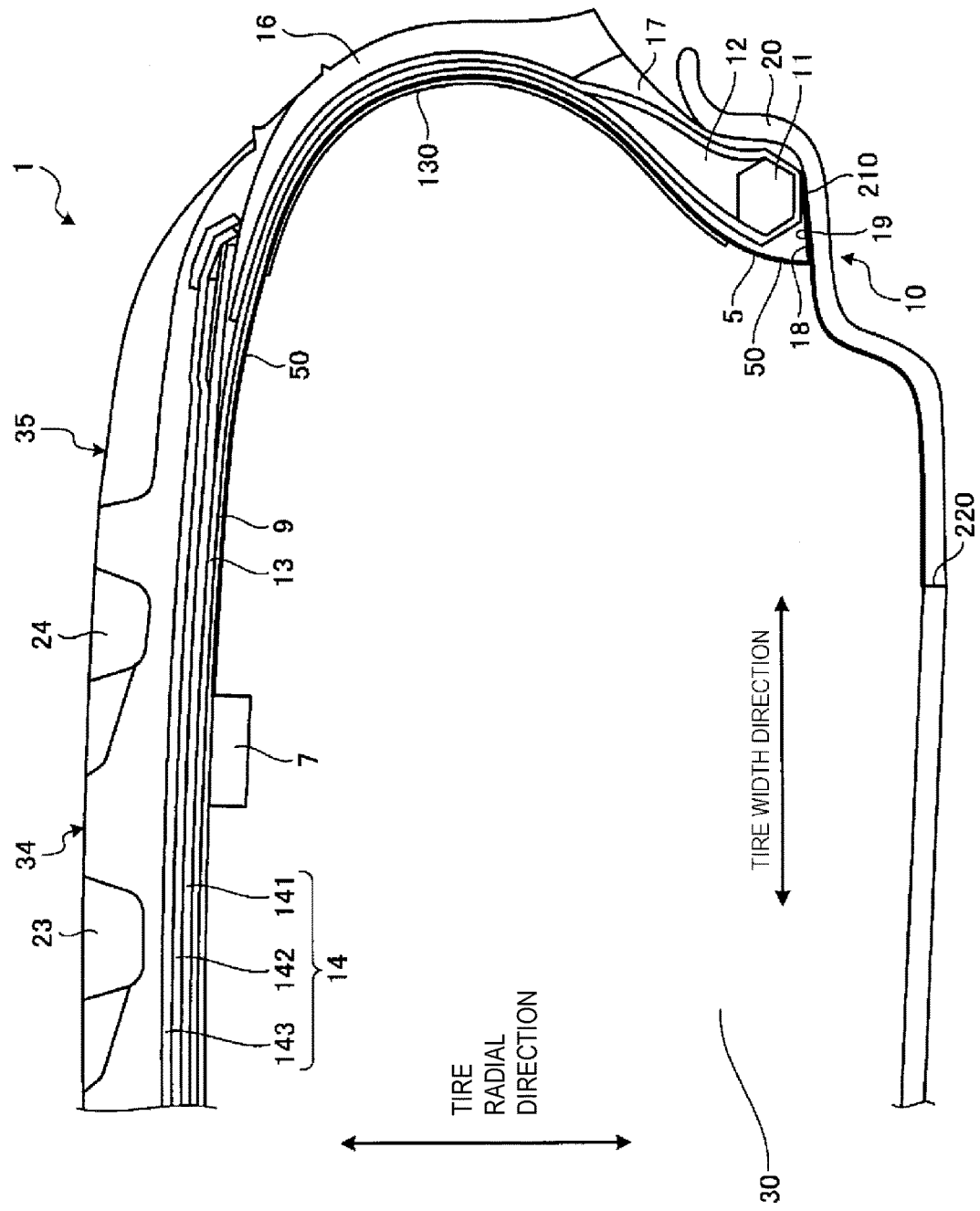
FIG. 6 is a diagram illustrating a state in which the tire is mounted on a rim.

FIG. 6 is a diagram illustrating a state in which the tire 1 is mounted on a rim. As illustrated in FIG. 6, a rim 20 includes an electrode 210 in a portion that comes into contact with the bead base portion 19 of the tire 1. In a case where the tire 1 is mounted on the rim 20, a portion of the electrically conductive member 5 is in electrical contact with the electrode 210. Thus, in a case where an electrical device 7 is provided in the tire 1, the electrically conductive member 5 can electrically connect the electrode 210 provided on the rim 20 on which the tire 1 is mounted to the electrical device 7. The electrically conductive member 5 is disposed extending in a band-like shape to connect the bead portion 10 and the electrical device 7. As illustrated in FIG. 6, wiring 220 is electrically connected to the electrode 210. Accordingly, power can be fed to the electrical device 7 via the wiring 220, the electrode 210, and the electrically conductive member 5. Note that power fed to the electrical device 7 includes a power supply voltage, a signal, and data.

It is not necessary that the entire region between the electrode 210 and the electrical device 7 forms the electrically conductive member 5 and is electrically connected, but a part of the region may be exclusively electrically connected (e.g., the flex zone FZ). In other words, the electrically conductive member 5 electrically connects at least a part of the region between the electrical device 7 and the electrode 210 provided on the rim 20.

Path of Electrically Conductive Member

Figure 7:
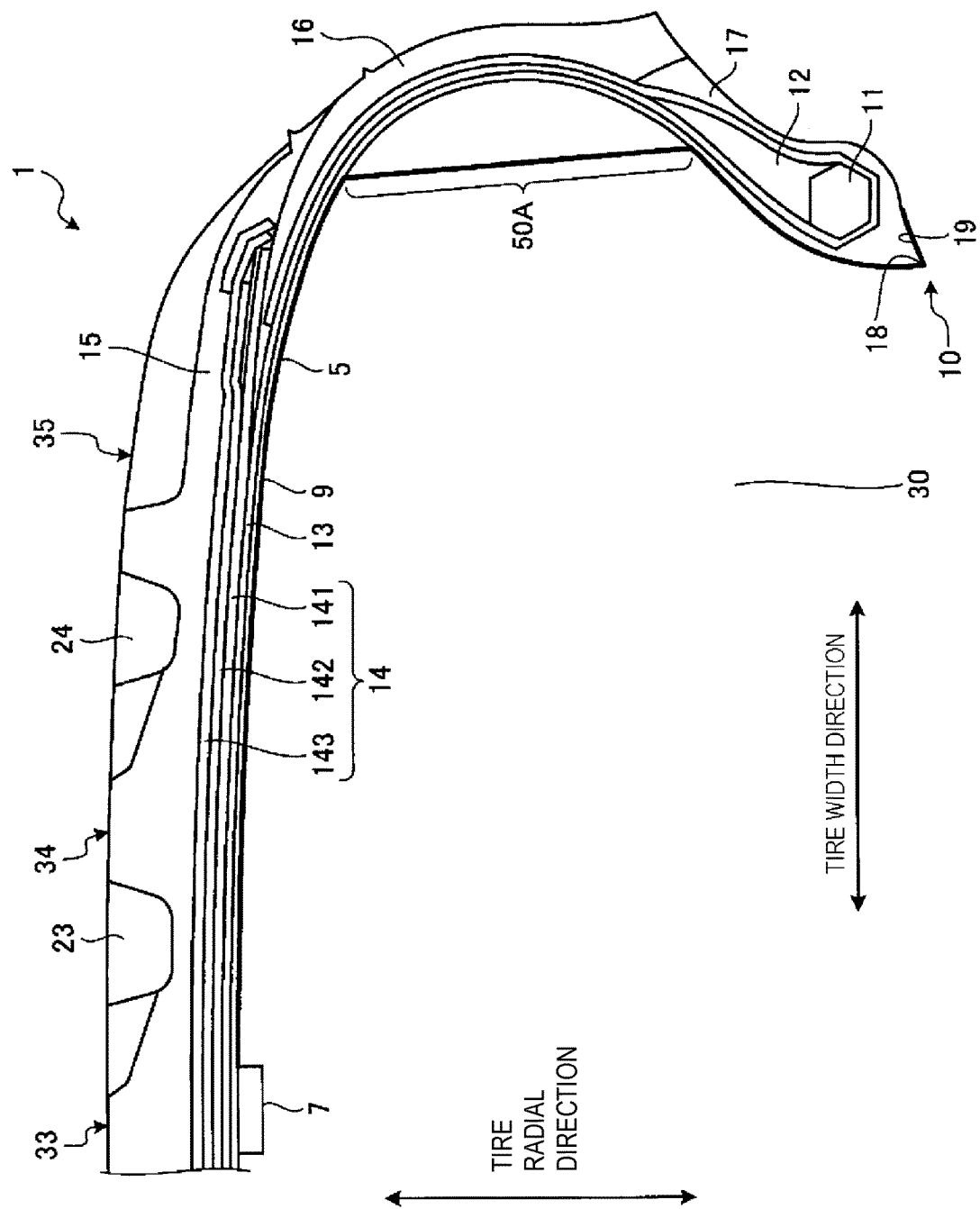
FIG. 7 is a diagram illustrating an example of a path through which the electrically conductive member passes.

As illustrated in FIGS. 1, 4, and 6, at least a part of the electrically conductive member 5 passes through the tire inner surface. However, a part of the electrically conductive member 5 may pass through a portion of the tire inner cavity 30 away from the tire inner surface. FIG. 7 is a diagram illustrating an example of a path through which the electrically conductive member 5 passes. In the example illustrated in FIG. 7, a portion 50A of the electrically conductive member 5 is not joined to the tire inner surface and floats in the tire inner cavity 30. A part of the region between the electrical device 7 and the electrode 210 passes through a portion of the tire inner cavity 30 located away from the tire inner surface, and this configuration makes the length of the electrically conductive member 5 shorter than a configuration in which the total length of the electrically conductive member 5 passes through the tire inner surface. This allows suppression of an increase in power consumption or a heating value and enables a reduction in the mass or cost of the electrically conductive member 5.

A range of the portion 50A of the electrically conductive member 5 is preferably equal to a range included in the flex zone FZ, for example. In the flex zone FZ, in a case where the portion 50A of the electrically conductive member 5 passes through the portion of the tire inner cavity 30, the electrically conductive member 5 does not conform to the tire inner surface, even in a case where significant local deformation occurs in the sidewall portion of the tire 1, for example, when the vehicle drives over the curb. Thus, damage to the electrically conductive yarn 511 is suppressed and durability is improved.

Figure 8:
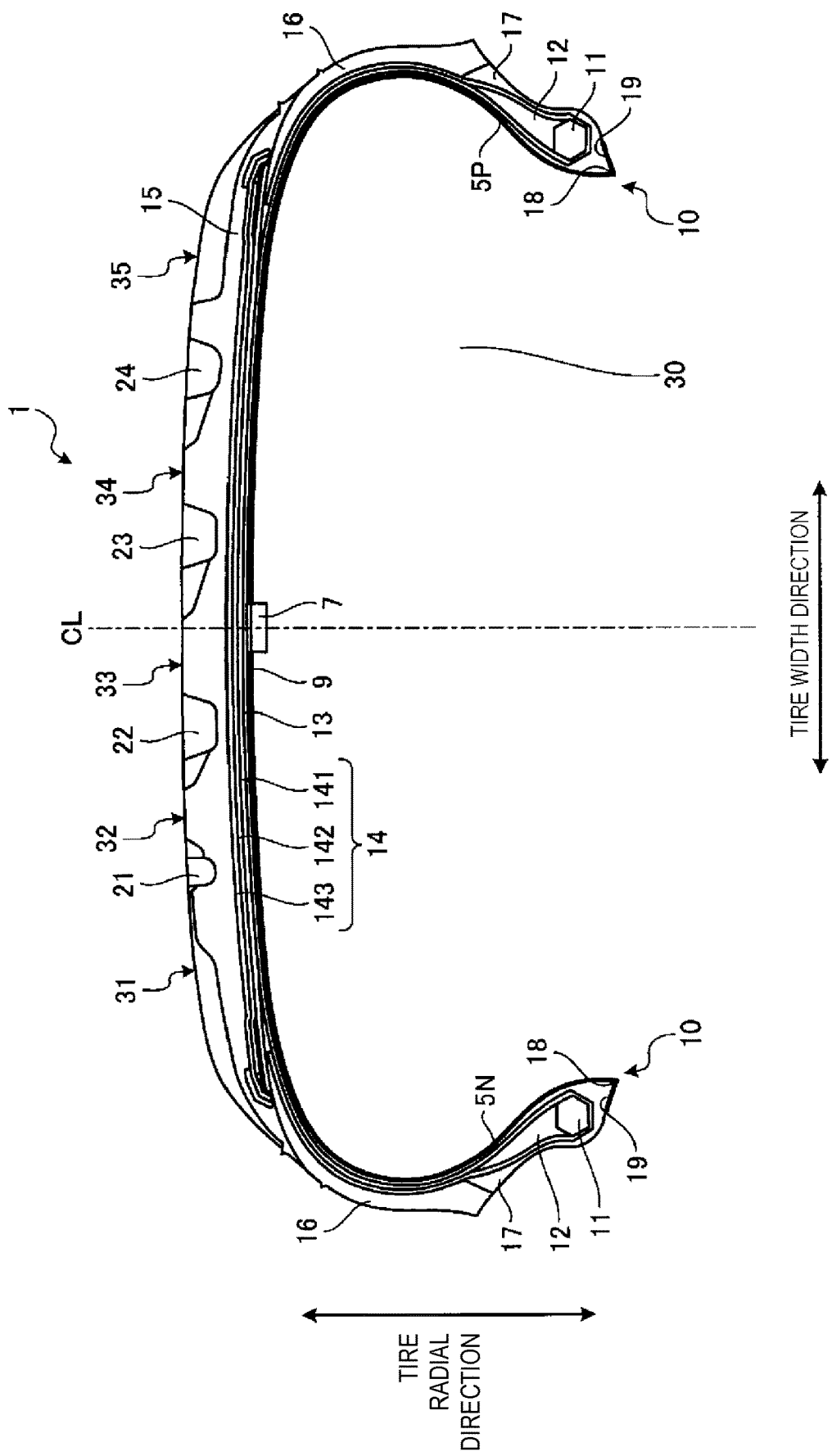
FIG. 8 is a diagram illustrating an example in which each one of a pair of bead base portions is provided with a corresponding electrically conductive member.

The tire 1 may include electrically conductive members 5 corresponding to the respective pair of bead base portions 19. FIG. 8 is a diagram illustrating an example in which the electrically conductive members corresponding to the respective pair of bead base portions 19 are provided. As illustrated in FIG. 8, electrically conductive members 5P and 5N are provided corresponding to the respective pair of bead base portions 19. For example, the electrically conductive member 5P is associated with the positive electrode, the electrically conductive member 5N is associated with the negative electrode, and the electrically conductive members 5P and 5N are electrically connected to the electrodes that contact the corresponding bead base portions 19 and to the electrical device 7 provided in the tire 1. The electrically conductive member 5P is connected only to the positive electrode, and the electrically conductive member 5N is connected only to the negative electrode. Thus, the tire 1 can provide a positive potential and a negative potential to the electrical device 7 provided in the tire 1 via the electrically conductive members 5P and 5N and can feed power to the electrical device 7 via the electrically conductive members 5P and 5N.

Here, in a case where the positive electrode and the negative electrode are disposed on one side of the bead base portion 19, the positive electrode and the negative electrode need to be aligned with the electrically conductive members 5P and 5N in the tire circumferential direction during mounting on the rim. However, by using a configuration in which the electrically conductive member 5P is connected only to the positive electrode and in which the electrically conductive member 5N is connected only to the negative electrode, the alignment is unnecessary, improving work efficiency.

Electrical Device

The electrical device 7 is provided, for example, in the tire 1 after molding of the tire. The electrical device 7 is provided on the inner side in the tire radial direction of the tread portion and on the inner cavity side of the innerliner layer 9. The electrical device 7 is provided, for example, at a position crossing the tire equatorial plane CL, as illustrated in FIG. 8. A portion of the electrical device 7 is electrically connected to the electrically conductive member 5. The electrical device 7 is a device operating on electrical energy and includes an electronic circuit and an electrical actuator. The electrical device 7 is, for example, a circuit including a power generating element, a circuit including a sensor for measuring physical quantity such as a pressure, temperature, acceleration, electric field, magnetic field, electrical potential, electrical resistance, or the like, an actuator such as a motor or a pump, a communication module, a radio tag, a rectifier circuit for a receiving or transmitting antenna for non-contact electric power supply, a secondary battery, or the like. The electrical device 7 includes any of various sensors, a motor, a heater, an electromagnetic coil, any of various actuators, a circuit board, or the like alone or in combination with one another.

The electrical device 7 may be a connector for connecting electronic circuits, electrical actuators, or the like. A connector may be installed on the tire inner surface when the tire is molded, and electronic circuits, electrical actuators, or the like may be connected to the connector after molding of the tire. Connecting electronic circuits, electrical actuators, and the like via the connector facilitates replacement of the electronic circuits, electrical actuators, or the like, allowing enhancements, modifications, and failures to be dealt with.

Note that the electrical device 7 may be fed with power by the electrically conductive member 5 and may transmit and receive data by electric power line carrier communication via the electrically conductive member 5. In the example illustrated in FIG. 8, the electrically conductive member 5 is provided to extend from the electrical device 7 to an electrode provided on a rim of the bead base portion 19. Thus, the electrical device 7 can receive power fed from the electrode provided on the rim via the electrically conductive member 5, for example. Additionally, the electrical device 7 can transmit and receive data to and from the electrode provided on the rim via the electrically conductive member 5, for example.

Placement Region of Electrical Device

Now, a preferred placement region of the electrical device 7 will be described. The electrical device 7 requires efforts to fix the electrical device 7 to an inner surface of the tire 1. In various traveling modes of the vehicle, such as starting, acceleration, deceleration, stoppage, and the like, there are some regions where local deformation of the tire 1 is relatively significant and other regions where local deformation of the tire 1 is relatively insignificant. In order to stably fix the electrical device 7 to the inner surface of the tire 1, an area where local deformation of the tire 1 is significant is preferably avoided, and the electrical device 7 is preferably disposed in a region where local deformation of the tire 1 is insignificant. Thus, the electrical device is preferably disposed in a region other than portions of the sidewall portion of the tire 1 where the portions deform relatively significantly. The electrical device is preferably disposed in a region other than portions located immediately below circumferential grooves.

Figure 9:
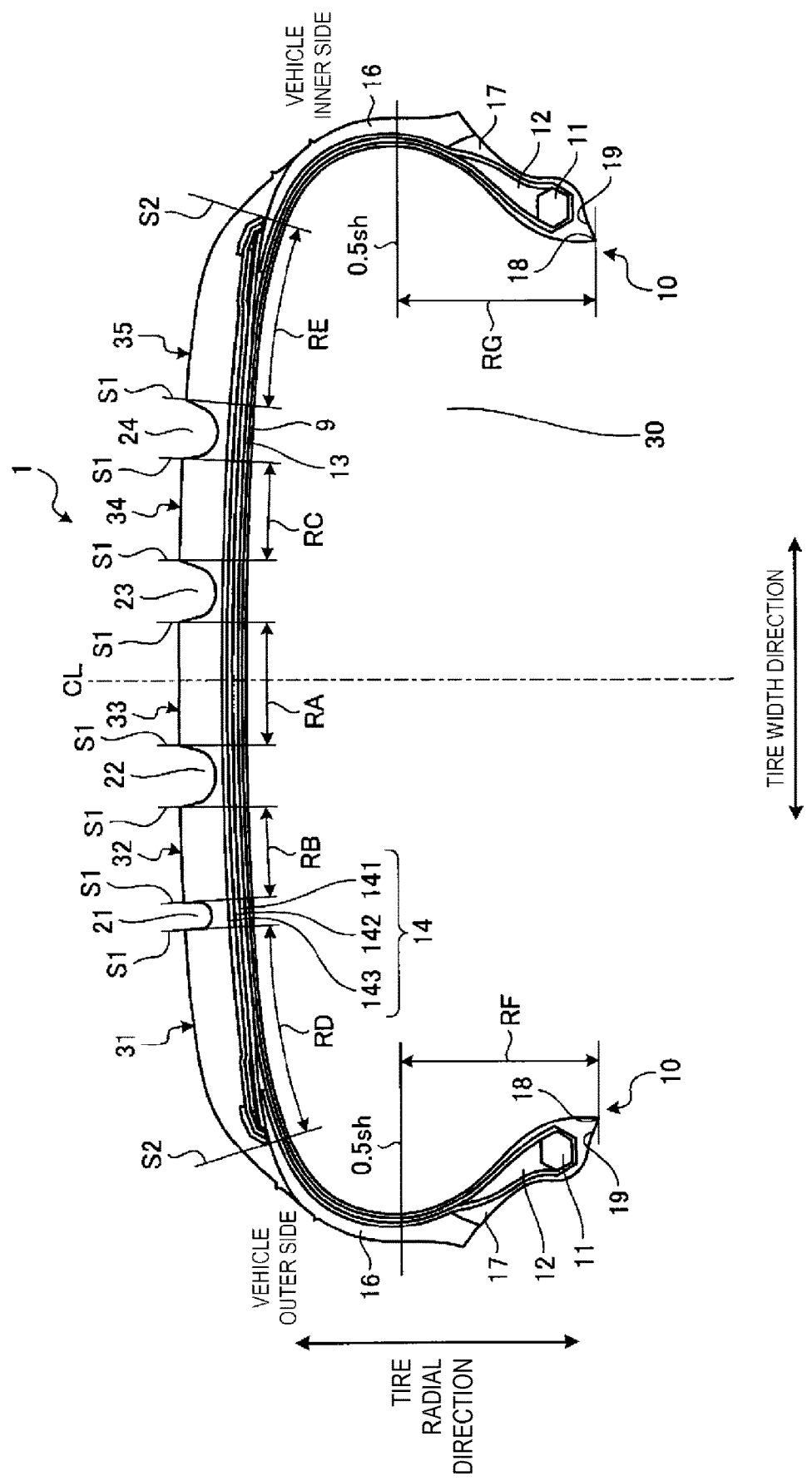
FIG. 9 is a diagram illustrating an example of a placement region for an electrical device.

FIG. 9 is a diagram illustrating an example of a placement region for the electrical device. FIG. 9 is a cross-sectional view in the tire meridian direction. FIG. 9 illustrates a tire in which four circumferential grooves are disposed in the tread portion. In FIG. 9, the circumferential grooves 21 to 24 have a groove width of 3 mm or longer in a tire outer surface and a maximum groove depth of 40% or greater of the thickness of the tread rubber 15. The circumferential grooves 21 to 24 may have a serpentine shape or a zigzag shape extending in the tire circumferential direction with the position in the tire width direction varied.

In FIG. 9, a normal line extending from an end portion of each of the circumferential grooves in an outer surface of the tire 1 to the inner surface of the tire 1 is defined as a normal line S1. Additionally, a normal line extending from an outermost position defined by either the cross belt 141 or 142 or the belt cover 143 to the inner surface of the tire 1 is referred to as a normal line S2. Regions RA to RE are defined on the inner surface of the tire 1 by using the normal lines S1 and S2. The regions RA, RB, and RC are located on the inner surface of the tire 1, are regions other than the circumferential groove regions, and are regions each sandwiched by the adjacent normal lines S1. The regions RD and RE are located on the inner surface of the tire 1 and are regions each sandwiched between the normal line S1 and the normal line S2. The region RD is a region on a vehicle outer side of the tire equatorial plane CL. The region RE is a region on a vehicle inner side of the tire equatorial plane CL.

Additionally, a position 0.5Sh corresponding to 50% of the tire cross-sectional height Sh is used to define regions RF and RG on the inner surface of the tire 1. The regions RF and RG are located on the inner surface of the tire 1 and extend from the bead toe 18, corresponding to an end portion of the inner surface of the tire 1, to the position 0.5Sh of 50% of the tire cross-sectional height Sh. The region RF is a region on the vehicle outer side of the tire equatorial plane CL. The region RG is a region on the vehicle inner side of the tire equatorial plane CL. The regions RF and RG are located in a region other than portions of the sidewall portion of the tire 1 where the portions deform relatively significantly.

Note that in the following description, "disposition" for the electrical device 7 refers to half or greater of the electrical device 7 being within one of the regions RA to RG in a plan view as seen from the inner surface of the tire 1.

The electrical device 7 including an acceleration sensor may be provided in the tire 1 in order to determine a contact patch shape by estimating the amount of deformation of the tire tread and the time required for the deformation. In that case, the electrical device 7 is preferably disposed at a position corresponding to the tread portion. Specifically, the electrical device 7 is preferably disposed in any of the regions RA, RB, RC, RD, and RE illustrated in FIG. 9. In a case where the electrical device 7 is disposed in the region RD or the region RE, wiring from the bead portion 10 to the electrical device 7 can be shortened. In a case where the electrical device 7 is disposed in the region RA, measurement can be performed at the ground contact center of the tire 1.

The electrical device 7 including a magnetic sensor may be provided in the tire 1. The electrical device 7 including a magnetic sensor is provided for measuring geomagnetism or for measuring a magnetic field from a magnetic field generating element that is intentionally installed on the tire 1 or the vehicle body. In a case where the electrical device 7 includes a magnetic sensor, the electrical device 7 is preferably disposed at or near the bead portion 10 rather than in a tread portion located at or near the inner surface of the tire 1 where steel cords are disposed. Even in a case where the electrical device 7 is disposed at or near the bead portion 10, the electrical device 7 is preferably disposed at a position where a linear distance from the bead wire to the magnetic sensor is 2 mm or longer. Accordingly, in a case where the electrical device 7 includes a magnetic sensor, the electrical device 7 is preferably disposed in either the region RF or the region RG. However, in a case where the belt cords are non-magnetic materials such as aramid, the electrical device 7 may be disposed in any of the regions RA, RB, RC, RD, and RE.

The tire 1 may be provided with the electrical device 7 including a sensor for measuring electromagnetic fields; or the electrical device 7 that utilizes an electromagnetic physical phenomenon. In line with the recent trend to equip automobiles with electrical components, the types of electromagnetic waves generated from vehicles have increased. In addition, non-contact electric power supply between the vehicle and the road surface or between the vehicle and the wheel has been developed. In order to suppress the effects of the electromagnetic waves generated by the vehicle and to achieve measurement accuracy of the sensors and accurate actuation of the actuators, the electrical device 7 is preferably disposed on the vehicle outer side in a case where the electrical device is mounted on the vehicle. Thus, the electrical device 7 is preferably disposed in the region selected from the region RA on the vehicle outer side with respect to the equatorial plane CL, the region RB, the region RD, and the region RF. in accordance with other requirements.

Figure 10:
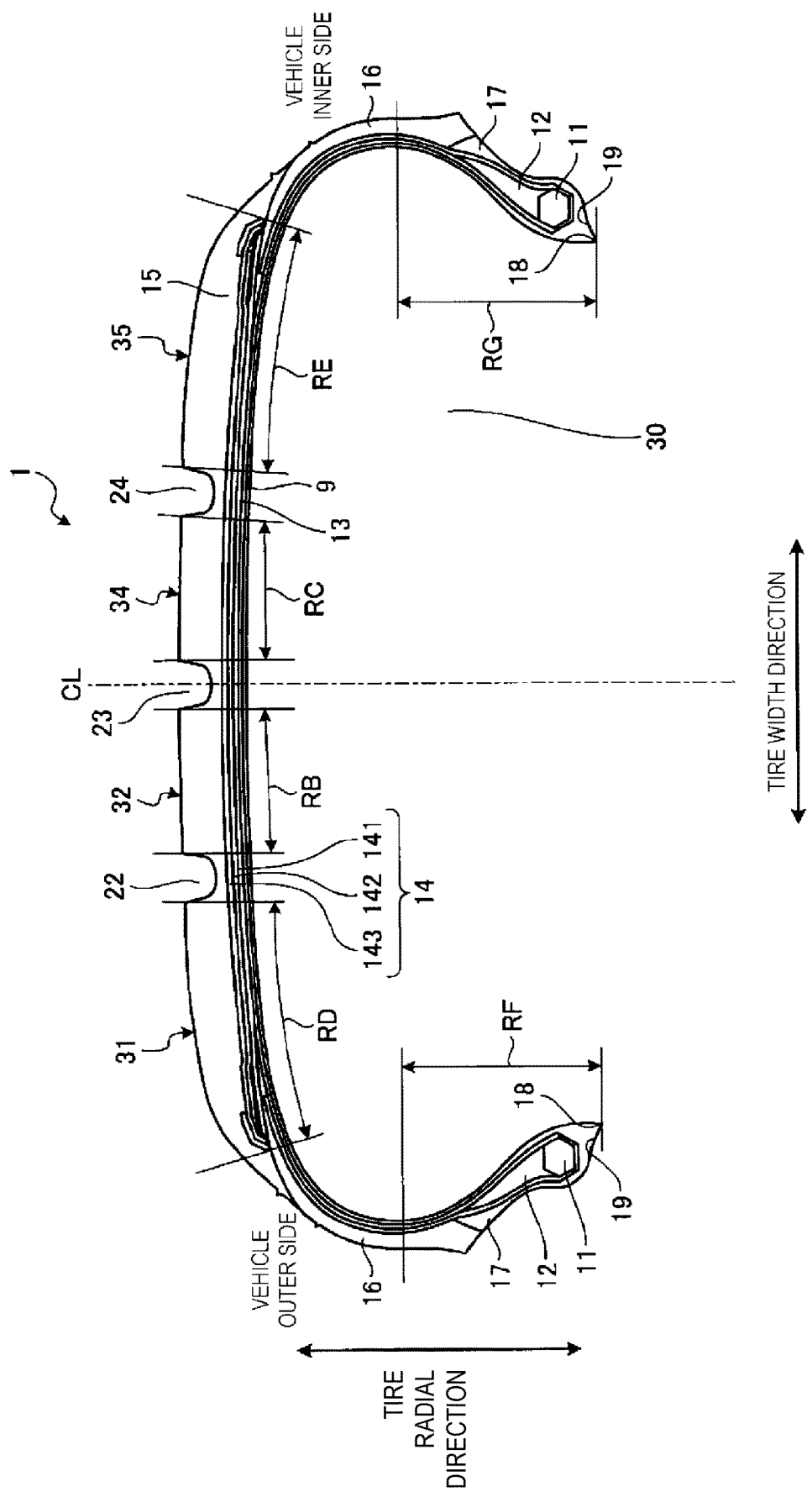
FIG. 10 is a diagram illustrating another example of the placement region for the electrical device.

FIG. 10 is a diagram illustrating another example of the placement region of the electrical device. FIG. 10 is a cross-sectional view in the tire meridian direction. FIG. 10 illustrates a tire in which three circumferential grooves are disposed in the tread portion. FIG. 10 illustrates a case in which the circumferential groove 23 is disposed on the equatorial plane CL. In the tire 1 illustrated in FIG. 10, as described above with reference to FIG. 9, the electrical device is preferably disposed in a region other than portions of the sidewall portion of the tire 1 where the portions deform relatively significantly. The electrical device is preferably disposed in a region other than portions located immediately below circumferential grooves. Specifically, the electrical device 7 is preferably provided in one of the regions RB, RC, RD, RE, RF, and RG. One of the regions RB, RC, RD, RE, RF, and RG in which the electrical device 7 is preferably provided is a region as described above with reference to FIG. 9.

As described above, on the inner surface of the tire 1, the electrical device 7 is preferably disposed in regions other than the portions immediately below the circumferential grooves and regions other than the portions of the sidewall portion that deform relatively significantly. In a case where the electrical device 7 is disposed in these regions, the electrical device 7 can be stably fixed to the inner surface of the tire 1. Additionally, by selecting an appropriate region and the disposing the electrical device 7 in the selected region, the effects of the electromagnetic waves generated by the vehicle can be suppressed, and measurement accuracy of the sensors and accurate actuation of the actuators can be achieved.

Placement Example of Electrical Device

Figure 11:
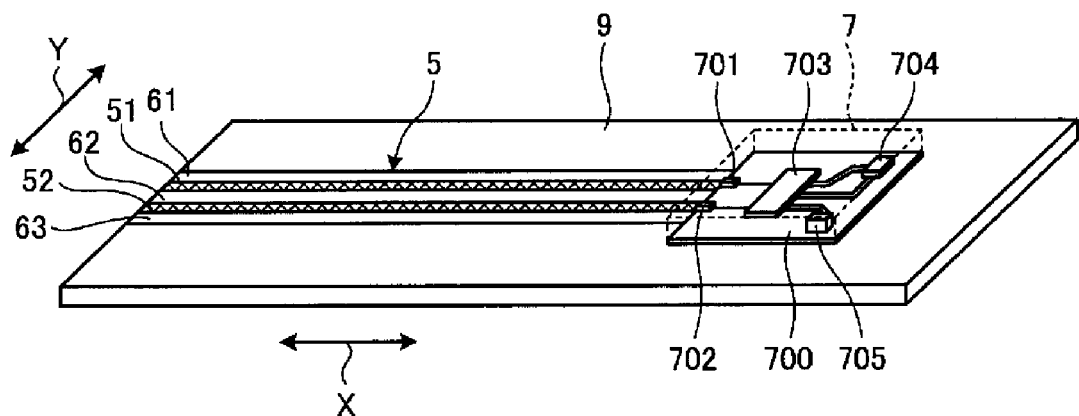
FIG. 11 is a diagram illustrating a placement example of the electrical device.
Figure 12:
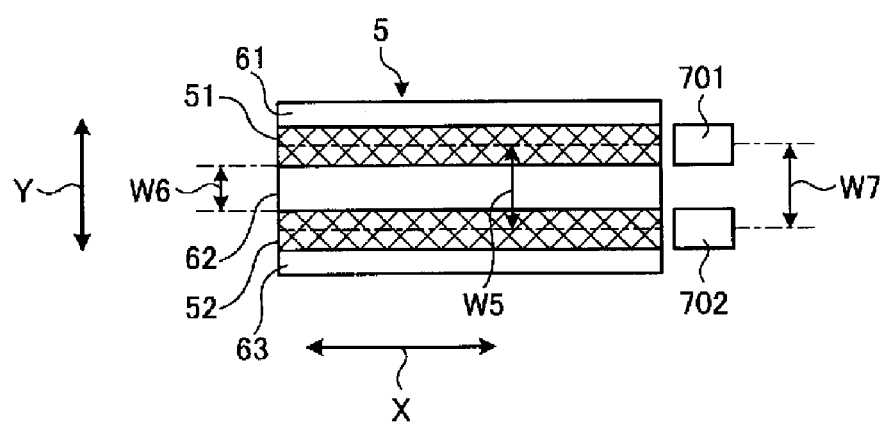
FIG. 12 is a diagram illustrating a placement example of the electrical device.

FIGS. 11 and 12 are diagrams illustrating a placement example of the electrical device 7. Although FIG. 11 illustrates the electrical device 7 such that an interior of the electrical device 7 can be understood, in practice, a resin mold or the like is present in a dashed portion to make the interior of the electrical device 7 invisible. As illustrated in FIG. 11, the electrically conductive member 5 is provided on a surface of the innerliner layer 9. The electrically conductive member 5 includes the electrically conductive portion 51 and the electrically conductive portion 52. The electrically conductive portion 51 and the electrically conductive portion 52 each extend in a band-like shape in the X direction. The distance between the electrically conductive portion 51 and the electrically conductive portion 52 is constant in the Y direction.

Additionally, the electrical device 7 is provided at an end portion of the electrically conductive member 5 on the surface of the innerliner layer 9. The electrical device 7 includes a substrate 700. A connection terminal 701 and a connection terminal 702 are provided on the substrate 700. The connection terminal 701 and the connection terminal 702 are fixed to the electrical device 7, and the spacing between the connection terminals 701 and 702 is constant. The connection terminal 701 and the connection terminal 702 are, for example, used to receive power. The substrate 700 is provided with electronic components 703, 704, and 705 such as an Integrated Circuit (IC) chip and a wireless communication module. The electronic component 703 is electrically connected to the connection terminal 701 and the connection terminal 702. The connection terminal 701 is electrically connected to the electrically conductive portion 51. The connection terminal 702 is electrically connected to the electrically conductive portion 52.

As described above, the electrical device 7 includes the connection terminals 701 and 702, to which the fed power is applied, the electrically conductive member 5 includes the band-like shaped electrically conductive portions 51 and 52 corresponding to the connection terminals 701 and 702, and the connection terminal 701 and the connection terminal 702 are at least partially electrically connected to the electrically conductive portion 51 and the electrically conductive portion 52, respectively.

As illustrated in FIG. 12, a distance W7 between the connection terminal 701 and the connection terminal 702 is preferably equal to a distance W5 between the electrically conductive portion 51 and the electrically conductive portion 52. Since the distance W7 and the distance W5 are equal, the connection terminal 701 and the connection terminal 702 are easily positioned with respect to the electrically conductive portion 51 and the electrically conductive portion 52, improving the efficiency of the work of connecting the electrical device 7 and the electrically conductive member by soldering or the like. Note that the distance W7 is between the center of the connection terminal 701 in the Y direction and the center of the connection terminal 702 in the Y direction. The distance W5 is between the center of the electrically conductive portion 51 in the Y direction and the center of the electrically conductive portion 52 in the Y direction.

In this manner, in a case where a plurality of the connection terminals 701 and 702 fixed to the electrical device 7 attached to the tire inner surface, with a constant spacing between the connection terminals 701 and 702, are electrically connected to the electrically conductive member 5 by soldering or the like, the spacing between the plurality of connection terminals 701 and 702 overlaps the spacing between the electrically conductive portions 51 and 52 in the Y direction. In a case where the spacing between the connection terminals 701 and 702 does not overlap the spacing between the electrically conductive portions 51 and 52 in the Y direction, wiring for realizing electrical connection needs to be separately provided. The separately provided wiring or the like may be fatigued and cut due to vibration involved in rotation of the tire 1, and this is not preferable. Thus, as illustrated in FIG. 12, the spacing between the plurality of connection terminals 701 and 702 overlaps the spacing between the electrically conductive portions 51 and 52 in the Y direction.

In FIG. 12, a width W6 of the non-electrically conductive portion 62 in the Y direction is preferably equal to or greater than 0.5 mm. This is to ensure the adhesion, to the tire inner surface, of the non-electrically conductive yarn constituting the non-electrically conductive portion 62 and to produce a minimum heat dissipation effect.

Figure 13:
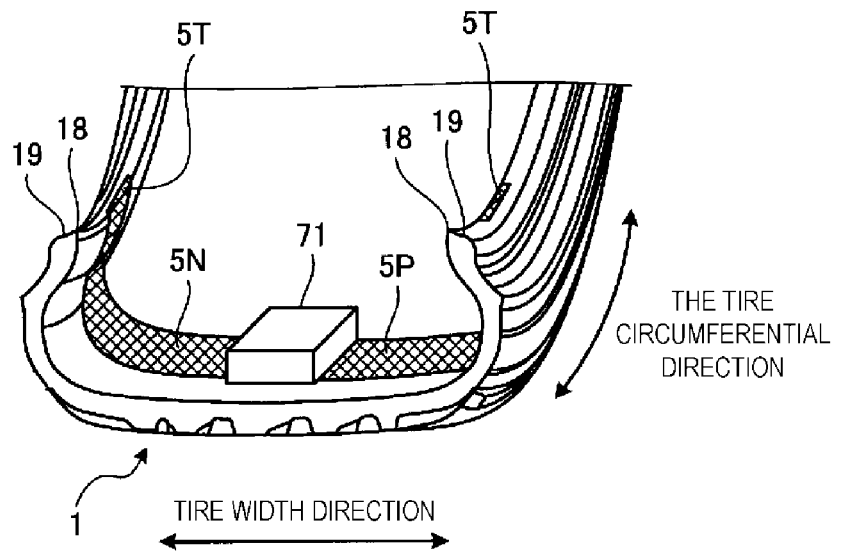
FIG. 13 is a diagram illustrating a placement example of an electrically conductive member with respect to an inner surface of the tire.
Figure 14:
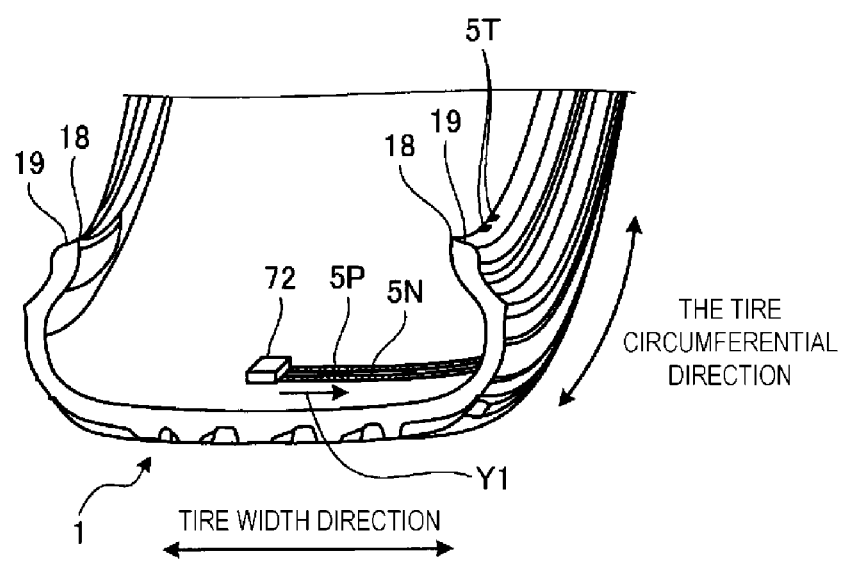
FIG. 14 is a diagram illustrating a placement example of the electrically conductive member with respect to the inner surface of the tire.
Figure 15:
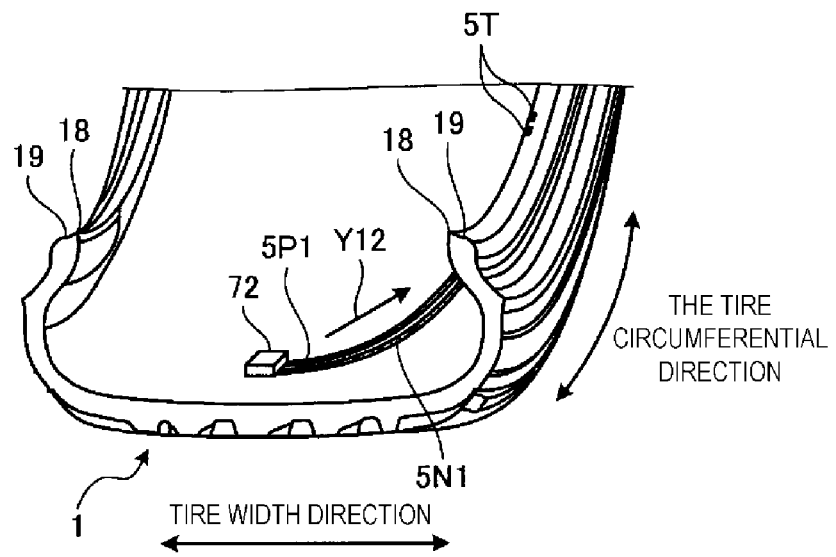
FIG. 15 is a diagram illustrating a placement example of the electrically conductive member with respect to the inner surface of the tire.

FIGS. 13, 14, and 15 are diagrams illustrating placement examples of the electrically conductive member 5 on the inner surface of the tire 1. FIGS. 13, 14, and 15 illustrate examples in which the electrical device 7 is disposed in the region RA described with reference to FIGS. 9 and 10. In FIGS. 13, 14, and 15, the electrically conductive member 5 is disposed extending along the tire inner surface. As illustrated in FIG. 13, for a large electrical device 71 requiring relatively high power, the electrically conductive members 5P and 5N are preferably used that have a wide width in the tire circumferential direction. End portions 5T of the electrically conductive members 5P and 5N are disposed on the bead base portions 19. In FIG. 13, the electrically conductive members 5P and 5N extend in the tire width direction from the position of the electrical device 71 and then extend in the tire radial direction along the tire inner surface to reach the bead base portion 19.

On the other hand, as illustrated in FIG. 14, for a small electrical device 72 operating on relatively low power, the electrically conductive members 5P and 5N arranged in the tire circumferential direction can be used. The end portions 5T of the electrically conductive members 5P and 5N are disposed on the bead base portions 19. In FIG. 14, an extension direction Y1 of the electrically conductive members 5P and 5N is parallel with the tire width direction. The electrically conductive members 5P and 5N extend in the tire width direction from the position of the electrical device 72 and then extend in the tire radial direction along the tire inner surface to reach the bead base portion 19. In the present example, the electrical device 72 aligns with the end portions 5T in the tire circumferential direction.

Additionally, the extension direction of the electrically conductive member may be disposed in a direction inclined with respect to the tire width direction rather than parallel with the tire width direction. That is, as illustrated in FIG. 15, electrically conductive members 5P1 and 5N1 connected to the electrical device 72 may extend in a direction inclined with respect to the tire width direction. In FIG. 15, an extension direction Y12 of the electrically conductive members 5P1 and 5N1 are not parallel with the tire width direction, and the extension direction Y12 is inclined with respect to the tire width direction. The electrically conductive members 5P1 and 5N1 extend in a direction inclined with respect to the tire width direction from the position of the electrical device 72 and extend in a direction inclined with respect to the tire radial direction along the tire inner surface to reach the bead base portion 19. Because the electrically conductive members 5P1 and 5N1 extend at an incline, the electrical device 72 does not align with the end portions 5T in the tire circumferential direction. Depending on the manner of knitting, the degree of stretchability and repeated durability of the knitted fabric 50 vary between the longitudinal direction (X direction) and the width direction (Y direction). Thus, in a region passing through the flex zone FZ described above, durability may be improved by displacement inclined with respect to the tire width direction.

Wiring Form

Figure 16:
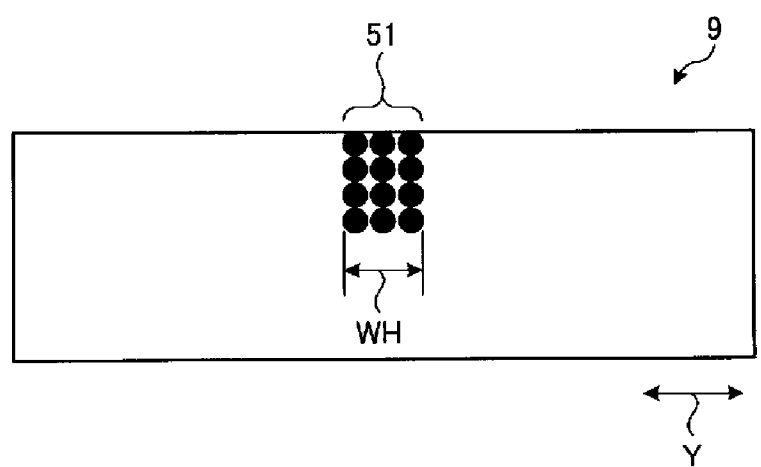
FIG. 16 is a cross-sectional view illustrating a state in which a part of the electrically conductive portion is embedded in rubber of an innerliner layer.
Figure 17:
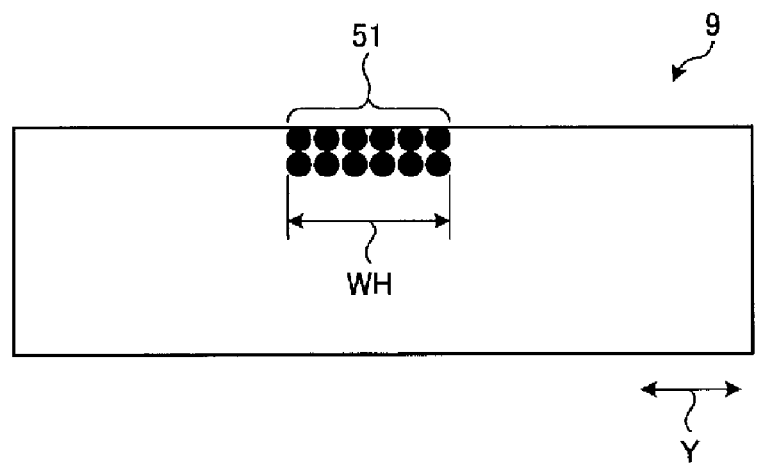
FIG. 17 is a cross-sectional view illustrating a state in which a part of the electrically conductive portion is embedded in the rubber of the innerliner layer.

Unlike in ordinary power wiring, at least a part of the electrically conductive member 5 contacts or is embedded in the rubber of the innerliner layer 9, and thus heat generated by power transmission is difficult to release. FIGS. 16 and 17 are diagrams illustrating heat generated by the electrically conductive member 5. FIGS. 16 and 17 are cross-sectional views illustrating a state in which a part of the electrically conductive portion 51 is embedded in the rubber of the innerliner layer 9. In FIG. 16 and FIG. 17, even with an identical cross-sectional area of the electrically conductive portion 51, a width WH orthogonal to the extension direction of the electrically conductive yarn that is exposed from the innerliner layer 9 is larger in the case of FIG. 17 than in the case of FIG. 16. Thus, the heat dissipation effect of the electrically conductive portion 51 is more excellent in the case of FIG. 17 than in the case of FIG. 16.

The cross-sectional area and the placement shape of the electrically conductive member 5 need to satisfy the conditions described below. In other words, a ratio Imax/s of a maximum value Imax (A) of the current transmitted to a total cross-sectional area S (mm$^2$) of the electrically conductive yarn constituting the electrically conductive member 5 is in a range of $0.01 \leq \mathrm{Imax}/S \leq 20$, and a ratio Pmax/WH of a maximum value Pmax (W) of power transmitted to the width WH (mm) orthogonal to the extension direction of the electrically conductive yarn constituting the electrically conductive member 5 is in a range of $0.01 \leq \mathrm{Pmax}/\mathrm{WH} \leq 2$. However, in a case where the electrically conductive yarn includes an insulating coating, the cross-sectional area is calculated with the exception of the insulating coating. These ranges are unique conditions for ensuring heat dissipation in a case where at least a part of the metal wire is embedded in the rubber, with a current passing through the metal wire.

In a case where these ranges are exceeded, the temperature increases with heat dissipation failing to catch up with heat generation, and this is not preferable. Within the ranges, no problem is posed in terms of heat generation, but the resultant tire includes an excessive amount of electrically conductive yarn and is heavy, and this is not preferable. In a case where a plurality of electrically conductive portions are installed for power supply, such as a positive electrode and a negative electrode, the conditions described above need to be satisfied for each of the electrically conductive portions. Unlike the electrically conductive portion for power supply, the electrically conductive portion transmitting measurement signals and data need not satisfy the above-described conditions. This is because the transmission of measurement signals and data requires a very small amount of power, and thus heat generation does not pose a problem. Note that the ratio Imax/S is preferably represented by $0.02 \leq \mathrm{Imax}/S \leq 15$ and that the ratio Pmax/WH is preferably represented by $0.02 \leq \mathrm{Pmax}/\mathrm{WH} \leq 1.5$.

Modified Examples of Electrically Conductive Member

FIGS. 18 to 22 are plan views illustrating modified examples of the electrically conductive member 5 illustrated in FIG. 1. In FIGS. 18 to 22, the length direction or extension direction of the electrically conductive member 5 is defined as the X direction, and the width direction of the electrically conductive member 5 is defined as the Y direction. The Y direction is a direction orthogonal to the X direction.

Figure 18:
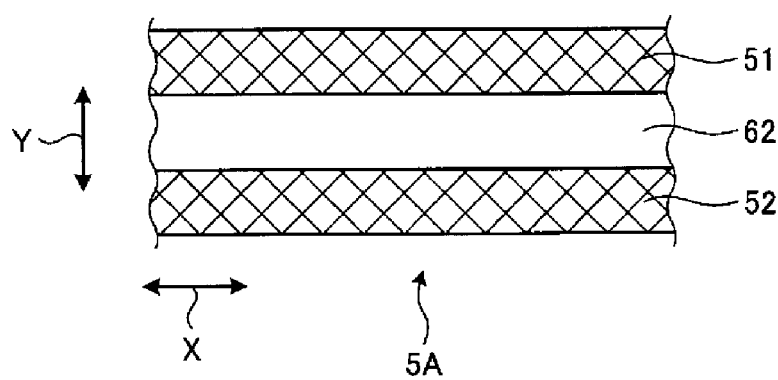
FIG. 18 is a plan view illustrating a modified example of the electrically conductive member in FIG. 1.

In a case where the adhesion between the electrically conductive yarn 511 and the rubber layer of the tire inner surface can be maintained in spite of a reduction in the area defined by the non-electrically conductive yarns 611 and 621, an electrically conductive member 5A including the electrically conductive portion 51, the non-electrically conductive portion 62, and the electrically conductive portion 52 disposed side by side in the Y direction can be used instead of the electrically conductive member 5, as illustrated in FIG. 18.

In FIG. 18, the electrically conductive member 5A includes the electrically conductive portions 51 and 52 arranged on the respective sides of the non-electrically conductive portion 62 in the Y direction. The electrically conductive portion 51, the non-electrically conductive portion 62, and the electrically conductive portion 52 all extend in the X direction. The non-electrically conductive portion 62 is disposed between the electrically conductive portion 51 and the electrically conductive portion 52. Thus, in the electrically conductive member 5A illustrated in FIG. 18, the two electrically conductive portions 51 and 52 are electrically insulated by the non-electrically conductive portion 62.

The electrically conductive member 5A illustrated in FIG. 18 has a configuration in which the non-electrically conductive portion 61 and the non-electrically conductive portion 63 are omitted from the electrically conductive member 5 illustrated in FIG. 2. The omission of the non-electrically conductive portion 61 and the non-electrically conductive portion 63 allows the electrically conductive member 5A to be made lighter than the electrically conductive member 5 illustrated in FIG. 2 and also enables a reduction in costs.

In addition, in a case where the insulation between the electrically conductive portion 51 and the electrically conductive portion 52 can be maintained, for example, when the electrically conductive portion 51 and the electrically conductive portion 52 are installed at a sufficient distance from each other, an electrically conductive member 5B including the electrically conductive portion 51 and the electrically conductive portion 52 separated from each other with no non-electrically conductive portion provided therebetween can be used instead of the electrically conductive member 5.

Figure 19:
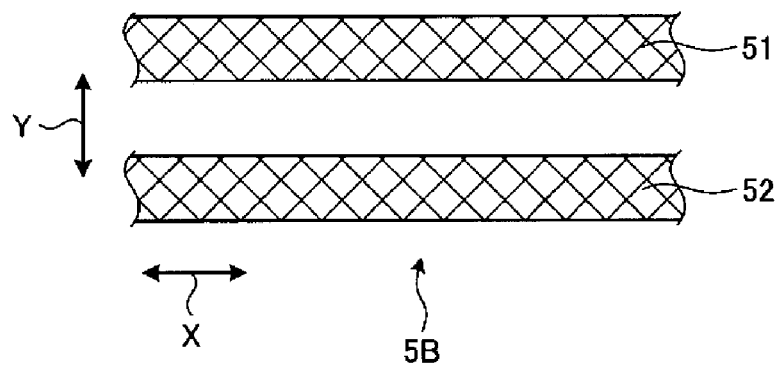
FIG. 19 is a plan view illustrating a modified example of the electrically conductive member in FIG. 1.

In FIG. 19, the electrically conductive member 5B includes the electrically conductive portion 51 and the electrically conductive portion 52 arranged side by side in the Y direction. The electrically conductive portion 51 and the electrically conductive portion 52 both extend in the X direction. The electrically conductive member 5B illustrated in FIG. 19 has a configuration in which the non-electrically conductive portions 61, 62, and 63 are omitted from the electrically conductive member 5 illustrated in FIG. 2. The omission of the non-electrically conductive portions 61, 62, and 63 allows the electrically conductive member 5B to be made much lighter than the electrically conductive member 5 illustrated in FIG. 2 and also enables a further reduction in costs.

According to the electrically conductive members 5, 5A, and 5B described with reference to FIG. 18 and FIG. 19, feeding of the power supply voltage can be achieved. In other words, the feeding of the power supply voltage can be achieved by associating the two electrically conductive portions 51 and 52 with the positive electrode and the negative electrode.

In addition to the two electrically conductive portions 51 and 52, another electrically conductive portion may be required. For example, in addition to power being fed by the two electrically conductive portions 51 and 52, signals to be processed by the electrical device may be transmitted by another electrically conductive portion. In this case, addition of the electrically conductive portion allows transmission of signals to be processed in the electrical device.

Figure 20:
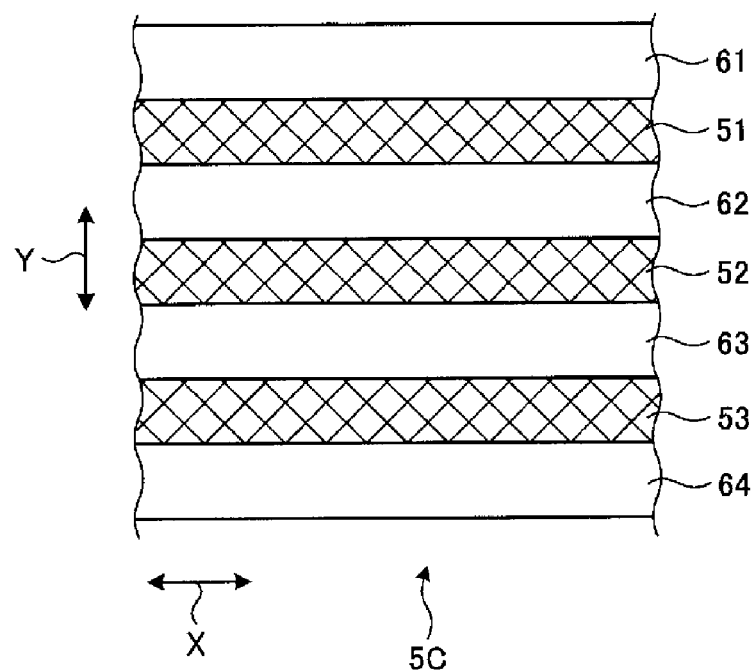
FIG. 20 is a plan view illustrating a modified example of the electrically conductive member in FIG. 1.

An electrically conductive member 5C illustrated in FIG. 20 has a configuration in which an electrically conductive portion 53 and a non-electrically conductive portion 64 are added to the electrically conductive member 5 illustrated in FIG. 2. The non-electrically conductive portions 61, 62, 63, and 64 have more stretchability along the X direction than the electrically conductive portions 51, 52, and 53. Thus, in a case where the electrically conductive member 5C is provided on the inner surface of the tire 1, routing is facilitated. The use of the electrically conductive member 5C facilitates the work of providing the electrically conductive member 5C along the inner surface of the tire 1.

Figure 21:
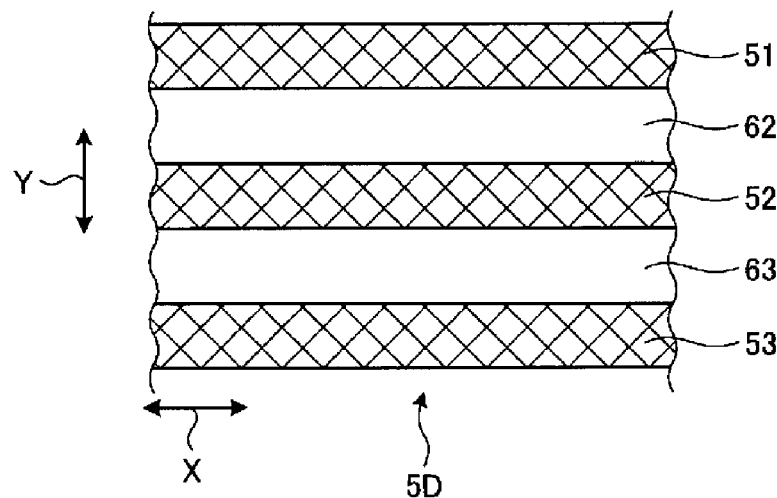
FIG. 21 is a plan view illustrating a modified example of the electrically conductive member in FIG. 1.

An electrically conductive member 5D illustrated in FIG. 21 has a configuration in which the electrically conductive portion 61 and the non-electrically conductive portion 64 are omitted from the electrically conductive member 5C illustrated in FIG. 20. The omission of the non-electrically conductive portion 61 and the non-electrically conductive portion 64 allows the electrically conductive member 5D to be made lighter than the electrically conductive member 5C illustrated in FIG. 20 and also enables a reduction in costs.

Figure 22:
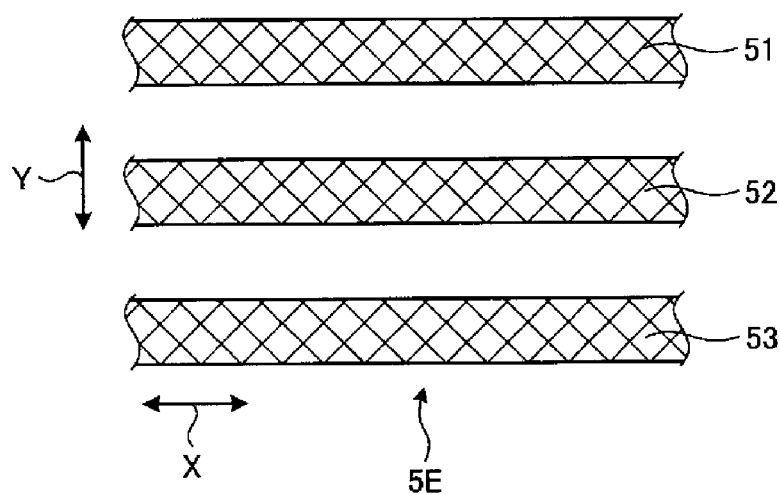
FIG. 22 is a plan view illustrating a modified example of the electrically conductive member in FIG. 1.

An electrically conductive member 5E illustrated in FIG. 22 includes the electrically conductive portion 51, the electrically conductive portion 52, and the electrically conductive portion 53 separated from one another, with no non-electrically conductive portion provided therebetween. In a case where the adhesion between the electrically conductive yarn 511 and the rubber layer of the tire inner surface can be maintained in spite of a reduction in the area defined by the non-electrically conductive yarns 611 and 621, for example, when the electrically conductive portions 51, 52, and 53 are installed at a sufficient distance from one another, the electrically conductive member 5E can be used instead of the electrically conductive member 5C.

In cases of FIGS. 20 to 22, a common negative electrode is used for power supply and signal transmission. A further electrically conductive portion may be added as necessary, and the separate negative electrodes may be used for power supply and for signal transmission.

Note that the electrically conductive members 5 and 5A to 5E described above may be used as electrically conductive materials that ensure the electrostatic removal function of the tire 1. In that case, at least a part of the electrically conductive yarn 511 is preferably exposed on the tire inner surface. Thus, soldering or the like can be used to connect with the electrical device 7 or the like after molding of the tire.

A part of the electrical conductor portion of the electrically conductive member 5 described above may be used as an antenna, and non-contact communication may be performed between a device external to the tire 1 and the electrical device 7. Accordingly, for example, data measured or processed by the electrical device 7 can be sent wirelessly to the device external to the tire 1, or the device external to the tire 1 can wirelessly send data to the electrical device 7.

Assembly Sheet

Figure 23:
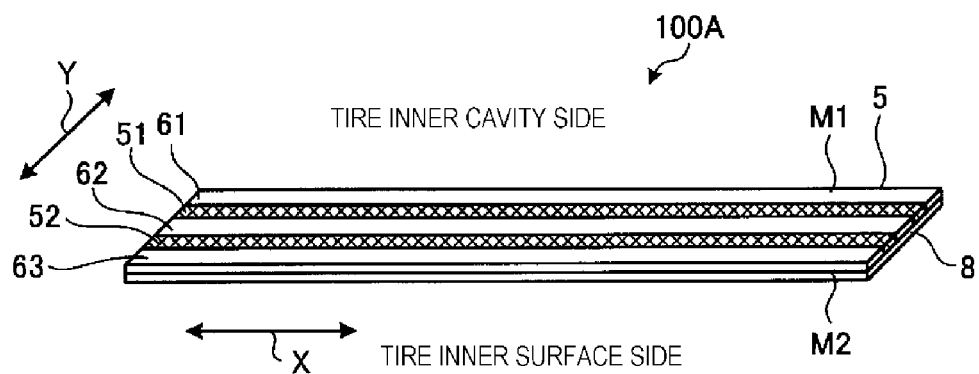
FIG. 23 is an appearance view illustrating an example of an assembly sheet that can be used during molding of the tire.
Figure 24:
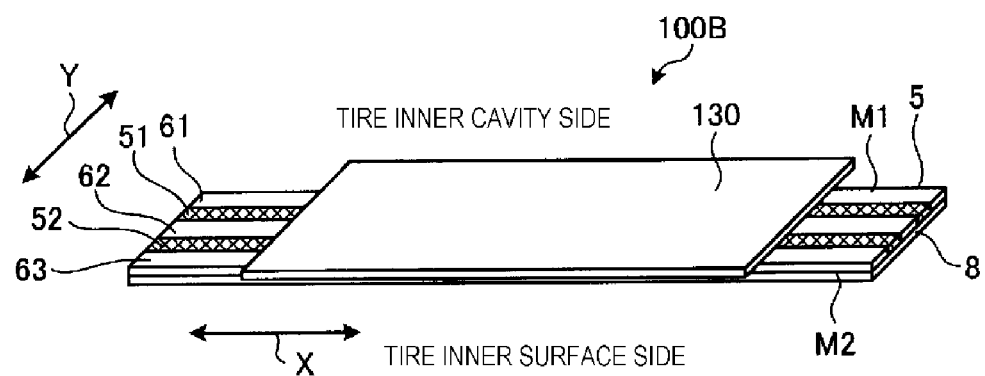
FIG. 24 is an appearance view illustrating an example of the assembly sheet that can be used during molding of the tire.
Figure 25:
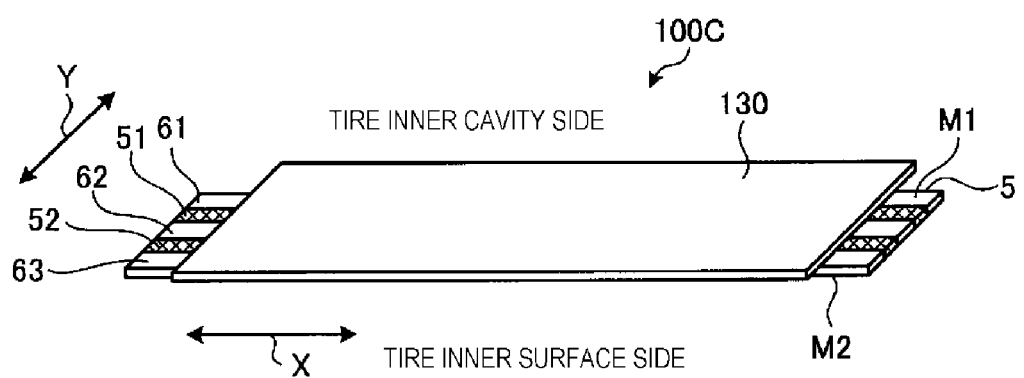
FIG. 25 is an appearance view illustrating an example of the assembly sheet that can be used during molding of the tire.

FIGS. 23 to 25 are appearance views illustrating examples of an assembly sheet that can be used during molding of the tire 1.

An assembly sheet 100A illustrated in FIG. 23 includes an electrically conductive layer including the electrically conductive member 5 including a knitted fabric configured by mixing a yarn having electrical conductivity and a yarn having non-electrical conductivity, the knitted fabric having stretchability, includes a rubber layer including an unvulcanized rubber sheet 8, and is made by layering these. In other words, the assembly sheet 100A has a structure in which the electrically conductive layer including the electrically conductive member 5 is layered on the rubber layer including the unvulcanized rubber sheet 8 and serving as a base. In the assembly sheet 100A illustrated in FIG. 23, the unvulcanized rubber sheet 8 and the electrically conductive member 5 may be compression-bonded to each other.

The assembly sheet 100A illustrated in FIG. 23 is prepared in advance, and the unvulcanized rubber sheet 8 is bonded to the tire inner surface, on an inner surface side of the tire 1 during the step of molding the tire 1, with the electrically conductive member 5 located on the side of tire inner cavity 30. In other words, the assembly sheet 100A is disposed on the surface of the innerliner layer 9 on the side of the inner cavity 30. Subsequently, vulcanization molding is performed. This facilitates tire molding. In other words, in a case where the electrically conductive member 5 alone is attached to the rubber of the tire inner surface during the step of molding the tire 1, the appropriate adhesive force may fail to be exerted and the electrically conductive member 5 may fall off after the molding step. By bonding, to the tire inner surface, the assembly sheet 100A illustrated in FIG. 23, an appropriate adhesive force is obtained.

The unvulcanized rubber sheet 8 preferably has a thickness of 1 mm or less. In a case where the unvulcanized rubber sheet 8 has a thickness of greater than 1 mm, the uniformity of the tire 1 is affected, and this is not preferable.

Incidentally, the rubber material of the rubber layer including the unvulcanized rubber sheet 8, which is used as a base in a case where the electrically conductive layer including the electrically conductive member 5 is placed in the tire 1, may, in terms of adhesion between the innerliner layer 9 and the electrically conductive member 5, be a rubber composition of an identical type to that of a rubber composition of the innerliner layer 9, and the rubber composition may be a rubber composition including: a rubber component; a condensation product of a compound represented by Formula (2) and formaldehyde; a methylene donor; and a vulcanizing agent. Note that, in Formula (2), $R^1$, $R^2$, $R^3$, $R^4$, and $R^5$ are each hydrogen, a hydroxyl group, or an alkyl group including from one to eight carbon atoms.

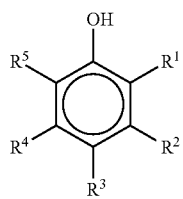

(2)

The assembly sheet 100B illustrated in FIG. 24 has a configuration such that the electrically conductive member 5 that is an electrically conductive layer is layered on the unvulcanized rubber sheet 8 that is a rubber layer and that the cover rubber layer 130 including another rubber layer is layered on the electrically conductive member 5. These layers may be compression-bonded together. The assembly sheet 100B illustrated in FIG. 24 is prepared in advance, and the unvulcanized rubber sheet 8 is bonded to the tire inner surface, on the inner surface side of the tire 1 during the step of molding the tire 1, with the cover rubber layer 130 located on the side of the tire inner cavity 30. Subsequently, vulcanization molding is performed. This facilitates tire molding, as in the case of FIG. 23.

The assembly sheet 100C illustrated in FIG. 25 includes the cover rubber layer 130 layered on an electrically conductive layer including the electrically conductive member 5. In the assembly sheet 100C illustrated in FIG. 25, in a case where the cover rubber layer 130 has a relatively high cover rate in the X direction of the electrically conductive member 5, a sufficient adhesive force is exerted in an extending portion in the Y direction of the cover rubber layer 130 by increasing the width of the cover rubber layer 130 in the Y direction. Thus, the unvulcanized rubber sheet on the tire inner surface side can be omitted in the assembly sheet 100C illustrated in FIG. 25.

As described with reference to FIGS. 23 to 25, the assembly sheets 100A, 100B, and 100C each include a rubber layer provided on at least one of a main surface M1 and another main surface M2 of the electrically conductive member 5 that is the electrically conductive layer, and the assembly sheets 100A, 100B, and 100C are assembly sheets configured by layering the rubber layer and the electrically conductive member 5 that is the electrically conductive layer. The assembly sheets 100A, 100B, and 100C described with reference to FIGS. 23 to 25 are disposed on the inner cavity side of the innerliner layer 9. In this case, at least a part of the yarn constituting the knitted fabric 50 is embedded in the rubber layer including the unvulcanized rubber sheet 8 and disposed on the inner cavity side of the innerliner layer 9.

100% Modulus

Here, the 100% modulus of the composite of the electrically conductive member 5 and the tire inner surface rubber layer is preferably 102% or greater and 180% or less of the 100% modulus of the tire inner surface rubber layer alone. The 100% modulus of the composite of the electrically conductive member 5 and the tire inner surface rubber layer is measured using a sample obtained by peeling between the carcass layer 13 and the innerliner layer 9 of the tire 1. The 100% modulus varies depending on the ratio between the thickness of the electrically conductive member 5 and the thickness of the tire inner surface rubber layer. Here, the 100% modulus is measured at the thickness of the actual tire 1. Note that, in a case where the unvulcanized rubber sheet or the cover rubber layer are layered, the 100% modulus is measured including the unvulcanized rubber sheet or the cover rubber layer. In other words, the 100% modulus is measured with all of the layers on the side of inner cavity 30 of the carcass layer 13 layered. In a case where the 100% modulus is less than the range described above, the innermost portion of the rubber in the tire 1 flows toward an outer side in the Y direction during vulcanization. The innermost rubber layer becomes thinner, degrading air barrier performance, and this is not preferable. With the 100% modulus greater than the above-described range, the installation portion of the electrically conductive member 5 has an increased rigidity, degrading uniformity, and this is not preferable.

The 100% modulus value of the composite is determined as follows: Specifically, the composite of the electrically conductive member and the rubber layer is sampled from the tire 1, from on an inner side of the carcass layer, over the width of the electrically conductive member, along the length direction of the electrically conductive member. The sample is then subjected to a tensile test. In the tensile test, the tensile stress (MPa) at 100% elongation is measured at a speed of 500 mm/min and a test temperature of 25° C. and is determined in accordance with JIS K6251. This value corresponds to the 100% modulus of the composite. The value of the 100% modulus of the tire inner surface rubber layer alone is measured in an identical manner.

The invention claimed is:
1. A pneumatic tire, comprising:
  a tire inner surface rubber layer constituting a tire inner surface, and
  an electrically conductive member, at least a part of the electrically conductive member being disposed on an inner cavity side of the tire inner surface rubber layer,
  the electrically conductive member comprising a knitted fabric comprising a yarn, at least a part of the yarn having electrical conductivity, the knitted fabric having stretchability, wherein
  the knitted fabric comprises an electrically conductive portion including the electrically conductive yarn and a non-electrically conductive portion including only a non-electrically conductive yarn, and the electrically conductive portion and the non-electrically conductive portion are side by side with each other in a plane view.

2. The pneumatic tire according to claim 1, wherein the electrically conductive member is electrically connected to an electrical device provided in the pneumatic tire.

3. The pneumatic tire according to claim 1, wherein
the electrically conductive member is disposed extending along the tire inner surface, and
a direction in which the electrically conductive member extends aligns with a direction in which the knitted fabric has stretchability.

4. The pneumatic tire according to claim 1, wherein the knitted fabric is configured by mixing a yarn having electrical conductivity and a yarn having non-electrical conductivity.

5. The pneumatic tire according to claim 4, wherein the yarn having electrical conductivity has a color different from a color of the yarn having non-electrical conductivity.

6. The pneumatic tire according to claim 1, wherein
the tire inner surface rubber layer is an innerliner layer, and
at least a part of the yarn constituting the knitted fabric is embedded in the innerliner layer or a rubber layer disposed on the inner cavity side of the innerliner layer.

7. The pneumatic tire according to claim 1, wherein
the electrically conductive member comprises a gap portion formed between the yarns constituting the knitted fabric, and
the tire inner surface rubber layer comprises an exposed region exposed on a surface of the knitted fabric through the gap portion.

8. The pneumatic tire according to claim 1, wherein the knitted fabric has an air permeation amount of 60 cm$^3$/cm$^2$·s or greater.

9. The pneumatic tire according to claim 1, wherein the electrically conductive member comprises a plurality of the electrically conductive members, wherein
each of the plurality of electrically conductive members is electrically connected to an electrical device provided in the tire, and
power is fed to the electrical device via the electrically conductive members.

10. The pneumatic tire according to claim 1, wherein the electrically conductive member is provided in a range of 40% or greater and 70% or less of a tire cross-sectional height.

11. The pneumatic tire according to claim 1, further comprising a cover rubber layer provided on a tire inner cavity side of the electrically conductive member and covering a part of the electrically conductive member.

12. The pneumatic tire according to claim 1, wherein the electrically conductive member extends on the tire inner surface beyond a bead toe of a bead portion at least to a bead base portion.

13. The pneumatic tire according to claim 12, wherein the electrically conductive member electrically connects at least a part of a region between the electrical device provided in the tire and an electrode provided on a rim on which the tire is mounted.

14. The pneumatic tire according to claim 13, wherein, in the part of the region between the electrical device and the electrode, the electrically conductive member passes through a tire inner cavity portion located away from the tire inner surface.

15. The pneumatic tire according to claim 13, wherein
the electrically conductive member is provided corresponding to each of a pair of the bead base portions,
the electrically conductive member is electrically connected to the electrode and to the electrical device provided in the tire, and
power is fed to the electrical device via the electrically conductive member.

16. The pneumatic tire according to claim 1, wherein a tensile force in a length direction of the electrically conductive member has a value per width of 0.01 N/mm or greater and 1.0 N/mm or less.

17. The pneumatic tire according to claim 1, wherein, for the electrically conductive member, a ratio Imax/S of a maximum value Imax (A) of current transmitted to a total cross-sectional area S (mm$^2$) of the yarn having electrical conductivity is 0.01≤Imax/S≤20, and
a ratio Pmax/WH of a maximum value Pmax (W) of power transmitted to a width WH (mm) orthogonal to an extension direction of the yarn having electrical conductivity is 0.01≤Pmax/WH≤2.

18. The pneumatic tire according to claim 1, wherein, on the tire inner surface, the electrical device provided in the tire is disposed in a region other than a portion immediately below a circumferential groove or in a region from an end portion of the tire inner surface to a position corresponding to 50% of a tire cross-sectional height.

19. The pneumatic tire according to claim 1, wherein
the electrically conductive yarn includes a number of metal wires bundled together and each having a diameter of 10 μm or longer and 100 μm or shorter, and
an electrical resistance of the electrically conductive member is in a range of 4 Ω/m or greater and 15 Ω/m or less.

20. The pneumatic tire according to claim 1, wherein the knitted fabric comprises the non-electrically conductive portion and at least two of the electrically conductive portions,
the non-electrically conductive portion is sandwiched between the at least two of the electrically conductive portions in a plane view, and
a width of the non-electrically conductive portion is equal to or greater than 0.5 mm.

21. A pneumatic tire comprising:
a tire inner surface rubber layer constituting a tire inner surface, and
an electrically conductive member, at least a part of the electrically conductive member being disposed on an inner cavity side of the tire inner surface rubber layer,
the electrically conductive member comprising a knitted fabric comprising a yarn, at least a part of the yarn having electrical conductivity, the knitted fabric having stretchability, wherein
the knitted fabric has an air permeation amount of 60 cm$^3$/cm$^2$·s or greater.

22. A pneumatic tire comprising:
a tire inner surface rubber layer constituting a tire inner surface, and
an electrically conductive member, at least a part of the electrically conductive member being disposed on an inner cavity side of the tire inner surface rubber layer,
the electrically conductive member comprising a knitted fabric comprising a yarn, at least a part of the yarn having electrical conductivity, the knitted fabric having stretchability, wherein
a tensile force in a length direction of the electrically conductive member has a value per width of 0.01 N/mm or greater and 1.0 N/mm or less.

23. A pneumatic tire comprising:
a tire inner surface rubber layer constituting a tire inner surface, and
an electrically conductive member, at least a part of the electrically conductive member being disposed on an inner cavity side of the tire inner surface rubber layer,
the electrically conductive member comprising a knitted fabric comprising a yarn, at least a part of the yarn having electrical conductivity, the knitted fabric having stretchability, wherein
for the electrically conductive member, a ratio Imax/S of a maximum value Imax (A) of current transmitted to a total cross-sectional area S (mm$^2$) of the yarn having electrical conductivity is $0.01 \leq Imax/S \leq 20$, and
a ratio Pmax/WH of a maximum value Pmax (W) of power transmitted to a width WH (mm) orthogonal to an extension direction of the yarn having electrical conductivity is $0.01 \leq Pmax/WH \leq 2$.

* * * * *